United States Patent
Caspar et al.

(10) Patent No.: US 7,153,617 B2
(45) Date of Patent: *Dec. 26, 2006

(54) LOW MOLECULAR WEIGHT ACRYLIC COPOLYMER LATEXES FOR DONOR ELEMENTS IN THE THERMAL PRINTING OF COLOR FILTERS

(75) Inventors: Jonathan V. Caspar, Henry Clay Village, DE (US); Gerald D. Andrews, Hockessin, DE (US); Gregory C. Weed, Towanda, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/511,856

(22) PCT Filed: Jan. 21, 2003

(86) PCT No.: PCT/US03/02058

§ 371 (c)(1),
(2), (4) Date: Oct. 14, 2004

(87) PCT Pub. No.: WO03/099574

PCT Pub. Date: Dec. 4, 2003

(65) Prior Publication Data

US 2005/0239647 A1      Oct. 27, 2005

(51) Int. Cl.
G03F 7/12    (2006.01)
G03F 7/34    (2006.01)

(52) U.S. Cl. .................. 430/7; 430/200; 430/271.1; 430/964

(58) Field of Classification Search ............... 430/200, 430/270.1, 271.1, 964, 7
See application file for complete search history.

(56) References Cited

U.S. PATENT DOCUMENTS

| | | | |
|---|---|---|---|
| 4,643,917 A | | 2/1987 | Koshizuka et al. |
| 4,942,141 A | | 7/1990 | DeBoer et al. |
| 4,948,776 A | | 8/1990 | Evans et al. |
| 5,019,549 A | | 5/1991 | Kellogg et al. |
| 5,156,938 A | | 10/1992 | Foley et al. |
| 5,171,650 A | | 12/1992 | Ellis et al. |
| 5,250,631 A | | 10/1993 | McCullough, Jr. |
| 5,395,729 A | * | 3/1995 | Reardon et al. ............ 430/200 |
| 5,523,192 A | | 6/1996 | Blanchet-Fincher |
| 5,540,147 A | * | 7/1996 | Johnson ..................... 101/211 |
| 5,563,019 A | | 10/1996 | Blanchet-Fincher |
| 5,879,855 A | | 3/1999 | Schadeli et al. |

(Continued)

FOREIGN PATENT DOCUMENTS

EP         0 339 353 A       11/1989

(Continued)

OTHER PUBLICATIONS

PCT International Search Report Dated Jun. 20, 2003. International Appln. No. PCT 03/02058, International Filing Date-Jan. 21, 2003, pp. (5).

*Primary Examiner*—Richard L. Schilling
(74) *Attorney, Agent, or Firm*—Thomas H. Magee

(57) ABSTRACT

A donor element is described for use in a thermal imaging process. The donor element includes a support; a heating layer, and a colorant containing thermally imageable layer comprising a crosslinkable binder having a number average molecular weight of about 1,500 to about 70,000. A process for making a color filter using a thermal imaging process, and a liquid crystal display using this color filter are also described.

30 Claims, 4 Drawing Sheets

U.S. PATENT DOCUMENTS

| | | |
|---|---|---|
| 6,020,416 A | 2/2000 | Mazur et al. |
| 6,051,318 A | 4/2000 | Kwon |
| 6,143,451 A | 11/2000 | Blanchet-Fincher |
| 6,221,543 B1 * | 4/2001 | Guehler et al. ................ 430/7 |
| 6,228,543 B1 * | 5/2001 | Mizuno et al. ............... 430/17 |
| 6,638,669 B1 * | 10/2003 | Schneider et al. ............ 430/17 |
| 6,921,614 B1 * | 7/2005 | Andrews et al. .............. 430/18 |
| 2003/0049547 A1 * | 3/2003 | Andrews et al. ............... 430/7 |
| 2005/0238968 A1 * | 10/2005 | Caspar et al. .................. 430/7 |

FOREIGN PATENT DOCUMENTS

| | | |
|---|---|---|
| EP | 1138731 | * 10/2001 |
| GB | 2083726 | 3/1982 |
| WO | WO 10/96116 | * 12/2001 |

* cited by examiner

LOW MOLECULAR WEIGHT ACRYLIC COPOLYMER LATEXES FOR DONOR ELEMENTS IN THE THERMAL PRINTING OF COLOR FILTERS

FIELD OF THE INVENTION

This invention relates to improved products and processes for effecting laser-induced thermal transfer imaging in the formation of color filters. The invention is of particular utility in the formation of color filters in high resolution liquid crystal displays.

BACKGROUND OF THE INVENTION

Liquid crystal display (LCD) devices have become increasingly important in displays that require very low consumption of electrical power or where the environment dictates a lightweight, planar, flat surface. For example, LCDs are used in display devices such as wristwatches, pocket and personal computers, flat panel television displays and aircraft cockpit displays. When there is a need to incorporate a color display capability into such display devices, a component called a color filter is used. For the device to have color capability, each LCD pixel is aligned with a color area, typically red, green, or blue, of a color filter array. Depending upon the image to be displayed, one or more of the pixel electrodes is energized during display operation to allow full light, no light, or partial light to be transmitted through the color filter area associated with that pixel. The image perceived by a user is a blend of colors formed by the transmission of light through adjacent color filter areas.

A major contributor to the cost of color LCDs is the color filter. Four color filter manufacturing methods are known in the art, viz., dye gelatin, pigmented photoresist, electrodeposition and printing. The pigmented photoresist method offers the best trade-off of degradation resistance, optical properties, and flexibility along with high resolution, and is generally preferred. While conventional photolithographic materials and methods may be employed in the photoresist method, it suffers from the high cost and inconvenience associated with numerous process steps, some involving wet chemistry.

Laser-induced thermal transfer processes are well-known in applications such as color proofing and lithography and have been described in, for example, Baldock, U.K. Patent 2,083,726; DeBoer, U.S. Pat. No. 4,942,141; Kellogg, U.S. Pat. No. 5,019,549; Evans, U.S. Pat. No. 4,948,776; Foley et al., U.S. Pat. No. 5,156,938; Ellis et al., U.S. Pat. No. 5,171,650; and Koshizuka et al., U.S. Pat. No. 4,643,917.

As is known in the art, laser-induced processes use a laserable assemblage comprising (a) a donor element containing the material to be transferred in contact with (b) a receiver element. The laserable assemblage is exposed to a laser, usually a suitable spatially modulated near-infrared laser, resulting in transfer of material from the donor element to the receiver element. To form an image, exposure takes place over a small region of the laserable assemblage at any one time, so that transfer of material from the donor element to the receiver element can be built up one pixel at a time. In this context the term pixel indicates the minimum addressable writing area of the laser exposure system. This laser addressable pixel size is generally smaller than the LCD color pixel size described above. Computer control of the writing laser produces transfer with high resolution and at high speed. The laserable assemblage, upon imagewise exposure to a laser as described supra, is henceforth termed an imaged laserable assemblage.

For the preparation of images for proofing applications and in photomask fabrication, the imageable component comprises a colorant. For the preparation of lithographic printing plates, the imageable component comprises an oleophilic material that will receive and transfer ink in printing.

Laser-induced processes are fast and result in transfer of material with high resolution. However, in many cases, the resulting transferred material does not have the required durability. In dye sublimation processes, light-fastness is frequently lacking. In ablative and melt transfer processes, poor adhesion and/or durability can be a problem. In U.S. Pat. No. 5,563,019 and U.S. Pat. No. 5,523,192, improved multilayer laserable assemblages and associated processes are disclosed that do afford improved adhesion and/or durability of the transferred images. In U.S. Pat. No. 6,051,318 an improved donor film for use in the production of color filters is disclosed. U.S. Pat. No. 6,143,451 discloses a laser-induced thermal image transfer imaging process characterized by the use of an ejection layer that affords advantages in the final imaged product.

As is known in the art, the thermally imageable layer in a laserable assemblage always contains some sort of binder, generally a polymeric binder. The binder serves to hold together the colorant and any adjuvants thereto before, during and after the image transfer process is effected, forming a single cohesive, homogeneous mass. It is found that the physical properties of the binder have significant effect on the properties of the transferred image. In particular, it has been found in the practice of the art that binders characterized by glass transition temperatures near or below room temperature provide good toughness and durability with superior adhesive properties, but often at the expense of resolution. On the other hand, binders characterized by glass transition temperatures well above room temperature provide superior resolution but at the expense of toughness, durability, and adhesion. Practical application of laser-induced thermal image transfer to high resolution applications such as color filter formation requires toughness and adhesion sufficient to permit survival of the transferred image during the remainder of the manufacturing process. The resolution requirements for the color filter application are extremely demanding, and little trade-off can be made while preserving utility in the application.

Aqueous blends of colloidally dispersed polymers for use in making organic coatings which are hard and ductile at ambient temperature and which remain stiff and elastic at elevated temperature are disclosed in Mazur et al, U.S. Pat. No. 6,020,416. The combination of properties is attributed to the use of blends of high molecular weight polymers differing in glass transition temperature.

A need exists for stable crosslinked pigmented images on a substrate wherein the surface of the image away from the substrate is an extremely smooth surface.

SUMMARY OF THE INVENTION

Improved products and processes for laser induced thermal imaging are disclosed herein.

In a first aspect, this invention provides a donor element comprising a thermally imageable layer, wherein the thermally imageable layer comprises a crosslinkable binder and a colorant, and wherein the crosslinkable binder has a number average molecular weight of about 1,500 to about 70,000, more typically about 5,000 to about 10,000, and most typically 10,000 to about 70,000.

In the first aspect, the colorant comprises an aqueous dispersion and the crosslinkable binder comprises an aqueous dispersion or solution.

In a second aspect, the invention provides a method for making a color image comprising:

(1) imagewise exposing to laser radiation a laserable assemblage comprising:
  (A) a donor element comprising a thermally imageable layer, and
  (B) a receiver element comprising:
    (a) a receiver support; and
    (b) an image receiving layer provided on the surface of the receiver support; wherein the thermally imageable layer comprises a crosslinkable binder having a number average molecular weight of about 1,500 to about 70,000; whereby the exposed areas of the thermally imageable layer are transferred to the receiver element to form a colorant-containing image on the image receiving layer; and
(2) separating the donor element (A) from the receiver element (B), thereby revealing the colorant-containing image on the image receiving layer of the receiver element.

In the second aspect, the invention further provides a method comprising:

(3) applying, typically laminating, the colorant-containing image on the image receiving layer of the receiver element to a permanent substrate, and removing the receiver support to transfer the colorant-containing image on the image receiving layer to the permanent substrate. The receiver support or the permanent substrate may be made of a transparent material such as glass. Alternately, the image receiving layer comprises a crosslinkable binder having a number average molecular weight of about 1,500 to about 70,000

In the second aspect, the invention also provides a method further comprising:

(4) applying, typically laminating, a planarizing film to the image receiving layer, and removing the support, wherein the planarizing film comprises a support and a planarizing layer. Alternately, the planarizing layer, image receiving layer or both may comprise a crosslinkable binder having a number average molecular weight of about 1,500 to about 70,000. The planarizing layer may have a crosslinkable binder having a weight average molecular weight of about 20,000 to about 110,000, more typically about 30 to about 100,000, and still more typically about 50,000 to about 85,000.

In a third aspect, the invention provides a method for making a color image comprising:

(1) imagewise exposing to laser radiation a laserable assemblage comprising:
  (A) a donor element having a thermally imageable layer comprising a crosslinkable binder having a number average molecular weight of about 1,500 to about 70,000, and
  (B) a permanent substrate; whereby the exposed areas of the thermally imageable layer are transferred to the permanent substrate to form a colorant-containing image on the permanent substrate; and
(2) separating the donor element (A) from the permanent substrate (B), thereby revealing the colorant-containing image on the permanent substrate. The permanent substrate may be glass or treated glass. Alternately, the permanent substrate may be a rigid plastic, e.g. polycarbonate, or a treated rigid plastic.

In a fourth aspect, the invention provides a color liquid crystal display comprising a color filter, wherein the color filter is prepared using a thermal imaging process, and a donor element comprising a thermally imageable layer having a crosslinkable binder and a colorant, wherein the crosslinkable binder has a number average molecular weight of about 1,500 to about 70,000.

DETAILED DESCRIPTION OF THE INVENTION

In accordance with the present invention, a color filter is prepared by a thermal transfer process, and then overlaid with additional layers to form a liquid crystal display. An assemblage is provided comprising a donor element and a receiver element. Planarizing elements may optionally also be used in forming the color filter.

Donor Element

Figure 2:
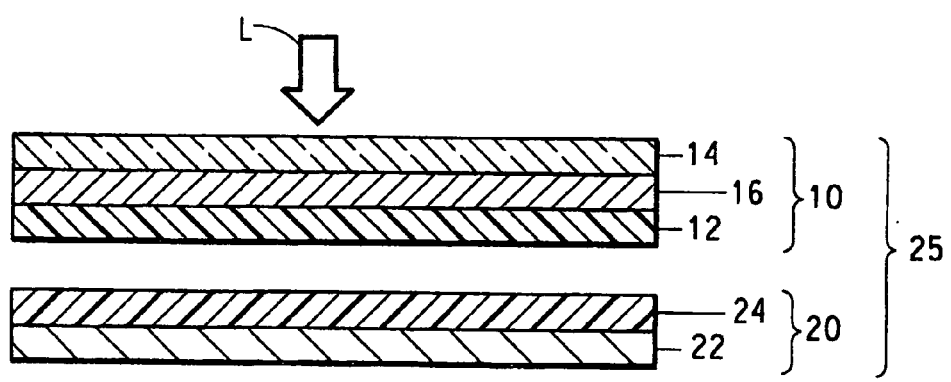
FIG. 2 is a simplified schematic diagram of an assemblage comprising a donor element and a receiver element for use in the thermally imaging process of the invention.

The donor element (10) comprises a thermally imageable layer (12) comprising at least one crosslinkable polymeric binder and a first colorant, and a base element. The base element comprises a base support (14) and an optional heating layer (16) between the base support (14) and the thermally imageable layer (12). As best seen in FIG. 2, the base support (14) provides support for the heating layer (16), if present, and the thermally imageable layer (12).

Base Support

The base support (14) of the donor element (10) is a dimensionally stable sheet material. Typically, the donor element (10) is flexible to facilitate subsequent processing steps, as described further, below. The base support (14) is transparent to laser radiation to allow for exposure of the thermally imageable layer (12), as described further, below.

Examples of transparent, flexible films appropriate for use as the base support (14) include, for example, polyethylene terephthalate ("polyester"), polyether sulfone, polyimides, poly(vinyl alcohol-co-acetal), polyolefins, or cellulose esters, such as cellulose acetate, and polyvinyl chloride.

Typically, the base support (14) of the donor element (10) is polyethylene terephthalate that has been plasma treated to accept the optional heating layer (16). Other materials can be present as additives in the base support, as long as they do not interfere with the essential function of the support. Examples of such additives include plasticizers, coating aids, flow additives, slip agents, antihalation agents, antistatic agents, surfactants, and others which are known for use in the formulation of films. The base support generally has a thickness in the range of 25–200 microns, preferably 38–102 microns.

Heating Layer

As best seen in FIG. 2, the function of the optional heating layer (16) of the donor element (10) is to absorb the laser radiation (L) used to expose the thermally imageable layer (12) and to convert the radiation into heat. The heating layer is typically a metal.

Some examples of other suitable materials are transition metal elements and metallic elements of Groups 13, 14, 15 and 16, their alloys with each other, and their alloys with the elements of Groups 1 and 2, which have less adhesion to the thermally imageable layer (12), or may be treated to have less adhesion, than the adhesion of the thermally imageable layer (12) to the receiving surface of the substrate (24) and absorb the wavelength of the laser. The IUPAC numbering system is used throughout, where the groups are numbered from left to right as 1–18 (CRC Handbook of Chemistry and Physics, $81^{st}$ Edition, 2000). Tungsten (W) is an example of a suitable transition metal.

Carbon, a Group 14, nonmetallic element, may also be used.

Nickel, aluminum, chromium and nickel vanadium alloys are typical metals for the heating layer (16). Chromium applied by sputtering is the most typical choice for the heating layer.

Alternatively, in FIG. 2, the optional heating layer (16) can be an organic layer comprising an organic binder and an infrared absorber. Examples of suitable binders are those that decompose at fairly low temperatures when heated such as polyvinyl chloride, chlorinated polyvinyl chloride and nitrocellulose. Examples of near infrared absorbers are carbon black and infrared dyes. Polymers with higher decomposition temperatures may also be employed in fabricating organic heating layers.

The thickness of the heating layer (16) depends on the optical absorption of the metals used. The most preferred metallization is such as to give 50% optical transmission at 830 nm, with a preferred range from 25% to 60% T.

Although it is preferred to have a single optional heating layer, it is also possible to have more than one heating layer, and the different layers can have the same or different compositions.

The optional heating layer (16) may be applied to the base support (14) by a physical vapor deposition technique. The term "physical vapor deposition" refers to various deposition approaches carried out in vacuum. Thus, for example, physical vapor deposition includes all forms of sputtering, including ion beam sputtering, as well as all forms of vapor deposition, such as electron beam evaporation and chemical vapor deposition. A specific form of physical vapor deposition useful in the present invention is RF magnetron sputtering. Nickel may be electron beam deposited onto the base support (14). Aluminum may be applied by resistive heating. Chromium, nickel and nickel vanadium layers may be applied by either sputtering or electron beam deposition.

In the case of optional heating layers comprised of organic layers, the heating layer may be applied by conventional solvent coating techniques.

Thermally Imageable Layer

The thermally imageable layer comprises a crosslinkable binder having a number average molecular weight of about 1,500 to about 70,000, more typically about 5,000 to about 10,000, and most typically about 10,000 to about 70,000. Typically, the binders are film forming and coatable from solution or from a dispersion. Binders having glass transition temperatures below about 110° C. are preferred.

It is preferred that the polymeric binder does not self-oxidize, decompose or degrade at the temperature achieved during the laser exposure so that the imageable component and binder are transferred intact for improved durability.

Process steps used to convert color filters into LCD panels often involve contact of the color filter with organic solvents such as N-methylpyrrolidinone, γ-butyrolactone, acetone, isopropanol, etc. Since these solvents swell, or even dissolve, the low molecular weight binder resins used in the thermally imageable layer (12), some form of crosslinking capability must be provided. This crosslinking should not take place to a significant extent until after the thermal imaging step. Premature crosslinking toughens the donor element to an extent that it is more difficult to image.

Some suitable pairs of functional groups for such crosslinking reactions include: hydroxyl and isocyanate; hydroxyl and carboxyl; hydroxyl and melamine-formaldehyde; carboxyl and melamine-formaldehyde; carboxyl and amine; carboxyl and epoxy, epoxy and amine; and carboxylic anhydride and amine. The epoxy/carboxyl and melamine-formaldehyde/carboxyl pairs are particularly effective since common aqueous pigment dispersants contain carboxyl groups which also can be incorporated into the final crosslinked polymer matrix.

The pairs of crosslinking functional groups can be utilized in several ways. One crosslinking functional group can be incorporated into the binder polymer backbone, and the other added as a polyfunctional low molecular weight crosslinking agent. One crosslinking functional group can be incorporated into the binder polymer backbone, and the other incorporated into a different binder polymer backbone. Both of the crosslinking functional groups can be incorporated into the same binder polymer backbone. The desired crosslink density of the final color filter dictates relative amounts of the pairs of crosslinking monomers.

Another crosslinking reaction involves one or more of the polymeric binders having pendant groups that are capable of undergoing free-radical induced or cationic crosslinking reactions. Pendant groups that are capable of undergoing free-radical induced crosslinking reactions are generally those that contain sites of ethylenic unsaturation, such as mono- and poly-unsaturated alkyl groups; acrylic and methacrylic acids and esters. In some cases, the pendant crosslinking group can be photosensitive, as is the case with pendant cinnamoyl or N-alkyl stilbazolium groups. Pendant groups that are capable of undergoing cationic crosslinking reactions include substituted and unsubstituted epoxide and aziridine groups.

The total binder concentration is generally in the range of about 15–50% by weight, based on the total weight of the thermally imageable layer, preferably 30–40% by weight.

The colorant in the thermally imageable layer may be a pigment or a non-sublimable dye. As is well known in the art, the introduction of pigments into the film compositions is most readily accomplished by employing pigment dispersants to prepare stable pigment dispersions. It is preferred to use a pigment as the colorant for stability and for color density, and also for the high decomposition temperature. The pigment is preferably chosen from pigments having (1) high transparency, and (2) small particle size, wherein the average particle size is less than about 100 nanometers. Some useful chemical classes of pigments include metal-containing phthalocyanines and halogenated derivatives, anthraquinones, pyrazolones, acetoacetyl monoazo, bisazo, and methine. Some examples of transparent pigments that can be used in this invention include RS Magenta 234-007™, GS Cyan 249-0592™ and RS Cyan 248-061, from Sun Chemical Co. (Fort Lee, N.J.); BS Magenta RT-333D™, Microlith Yellow 3G-WA™, Microlith Yellow 2R-WA™, Microlith Blue YG-WA™, Microlith Black C-WA™, Microlith Violet RL-WA™, Microlith Red RBS-WA™, Cromophthal Red 3B, Irgalite Blue GLO, and Irgalite Green 6G, from Ciba (Newport, Del.); Fanchon Fast Yellow 5700, from Bayer (Pittsburgh, Pa.); any of the Heucotech Aquis II™ series; any of the Heucosperse Aquis III™ series; and the like.

The amount of colorant present in the thermally imageable layer is chosen such that transmission optical densities of the final color filter image prepared upon the permanent substrate satisfactorily reproduces the required color gamut for the LCD display which will be constructed using the color filter. The color gamut for LCD displays is typically described using CIE chromaticity coordinates x, y and Y. While not intended to be limiting, typical donor element transmission optical densities are in the range from about 1.0 and about 2.5 for red, blue and green at the visible wavelength absorption maxima of the pigments, and between about 3.0 and about 4.0 for black at 550 nm. In general, the colorant is present in an amount of from about 20 to about 80% by weight, typically about 30 to about 50% by weight, based on the total weight of the transfer coating.

A dispersant is usually present when a pigment is to be transferred, in order to achieve maximum color strength, transparency and gloss. The dispersant is generally an organic polymeric compound and is used to separate the fine pigment particles and avoid flocculation and agglomeration. A wide range of dispersants is commercially available. A dispersant will be selected according to the characteristics of the pigment surface and other components in the composition as practiced by those skilled in the art. However, one class of dispersant suitable for practicing the invention is that of the AB dispersants. The A segment of the dispersant adsorbs onto the surface of the pigment. The B segment extends into the solvent into which the pigment is dispersed. The B segment provides a barrier between pigment particles to counteract the attractive forces of the particles, and thus to prevent agglomeration. The B segment should have good compatibility with the solvent used. The AB dispersants of choice are generally described in "Use of AB Block Polymers as Dispersants for Non-aqueous Coating Systems", by H. C. Jakubauskas, *Journal of Coating Technology*, Vol. 58, No. 736, pages 71–82. Suitable AB dispersants are also disclosed in U.K. Patent 1,339,930 and U.S. Pat. Nos. 3,684,771; 3,788,996; 4,070,388; 4,912,019; and 4,032,698. Other types of dispersants include graft copolymer dispersants, and random copolymer dispersants. Conventional pigment dispersing techniques, such as roll milling, media milling, ball milling, sand milling, etc., can be employed. For color filter applications, the binder polymer of the thermally imageable layer can also act as a dispersant for the pigment.

Other materials can be present as additives in the thermally imageable layer as long as they do not interfere with the essential function of the layer. Some examples of such additives include coating aids, plasticizers, flow additives, slip agents, antihalation agents, antistatic agents, surfactants, and others that are known to be used in the formulation of coatings. However, it is preferred to minimize the amount of additional materials in this layer, as they may deleteriously affect the final product after transfer to the final support.

The thermally imageable layer generally has a thickness in the range of about 0.1 to 5 microns, preferably in the range of about 0.1 to 1.5 microns. Thicknesses greater than about 5 microns are generally not preferred as they require excessive energy in order to be effectively transferred to the receiver and generally give poorly resolved images.

Although it is typical to have a single thermally imageable layer, it is also possible to have more than one thermally imageable layer, and the different layers can have the same or different compositions, as long as they all function as described above. The total thickness of the combined thermally imageable layers should be in the range given above.

The thermally imageable layer(s) can be coated onto the heating layer of the donor, if present, or directly on a support as a dispersion or a solution in a suitable solvent. Any suitable solvent can be used as a coating solvent, as long as it does not deleteriously affect the properties of the assemblage, using conventional coating techniques or printing techniques, for example, gravure printing or slot dye coating.

Additional Layers

An ejection layer (not shown) may optionally be provided between the optional heating layer (16) and the thermally imageable layer (12), as is known in the art. The ejection layer decomposes into gaseous molecules when heated, providing additional force to cause transfer of exposed portions of the thermally imageable layer (12) to the receiver element (20). A polymer having a relatively low decomposition temperature (less than about 350° C., preferably less than about 325° C., and more preferably less than about 280° C.) may be used. In the case of polymers having more than one decomposition temperature, the first decomposition temperature should be lower than 350° C. Suitable ejection layers are disclosed in U.S. Pat. No. 5,766,819, assigned to the assignee of the present invention. Thermal additives may also be provided in the ejection layer to amplify the effect of the heat generated in the heating layer (16), as is known in the art and also described in U.S. Pat. No. 5,766,819. U.S. Pat. No. 5,766,819 is incorporated by reference herein. By providing an additional decomposition pathway for the creation of gaseous products, additional propulsive forces can be generated to assist in the transfer process.

Optionally, there may be a release means (not shown) provided between the heating layer (16), if present, or the support (14) and the thermally imageable layer (12). This may be accomplished by oxygen plasma treating the heating layer (16) or the support (14). Alternately, release layers may be applied to either the heating layer (16), if present, or the support (14) prior to application of the thermally imageable layer (12). Some useful layers include hexamethyldisilazane (HMDS) available from Arch Chemicals, Inc., Norwalk Conn., dichlorosilane perfluordecane, available from Gelest, Inc., Tullytown, Pa., tridecafluoro-1,1,2,2-tetrahydooctyl-1-methyldichlorosilane, available from United Chemical Technologies, Inc., Bristol, Pa., etc. Release means may also be a heat activated release material.

Other donor elements may comprise alternate thermally imageable layer or layers on a support. Additional layers may be present depending of the specific process used for imagewise exposure and transfer of the formed images. Some suitable thermally imageable layers over which the overcoat described above may be applied are disclosed in U.S. Pat. No. 5,773,188, U.S. Pat. No. 5,622,795, U.S. Pat. No. 5,593,808, U.S. Pat. No. 5,334,573, U.S. Pat. No. 5,156,938, U.S. Pat. No. 5,256,506, U.S. Pat. No. 5,427,847, U.S. Pat. No. 5,171,650 and U.S. Pat. No. 5,681,681.

Receiver Element

The receiver element, illustrated in FIG. 2, comprises a receiver support (22) and an image-receiving layer (24), and optionally a cushion or release layer (not shown).

The receiver support (22) can be made of the same materials as the base support of the donor element. In addition, opaque materials, such as polyethylene terephthalate filled with a white pigment such as titanium dioxide, or synthetic paper, such as Tyvek® spunbonded polyolefin may be used as the receiver support. Typical materials for the receiver support (22) are polyethylene terephthalate and polyimide. Alternately, when the receiver element is used as the permanent substrate, the receiver support may include transparent plastic films, as described above, glass, and composites thereof. Thin glass substrates (0.5–1.0 mm thick) are typically used.

The image-receiving layer (24) may be a coating of, for example, a polycarbonate; a polyurethane; a polyester; polyvinyl chloride; styrene/acrylonitrile copolymer; poly(caprolactone); vinylacetate copolymers with ethylene and/or vinyl chloride; (meth)acrylate homopolymers (such as butyl-methacrylate) and copolymers; and mixtures thereof. This image-receiving layer may be present in any amount effective for the intended purpose. In general, good results have been obtained at coating weights of about 1 to about 5 g/m².

In addition to the image-receiving layer, the receiver element may optionally include one or more other layers between the receiver support and the image receiving layer. One additional layer between the image-receiving layer and the support is a release layer. In the intermediate transfer process where the receiver element is the intermediate transfer element, the release layer can provide the desired adhesion balance to the receiver element so that the image-receiving layer adheres to the receiver support during exposure and separation from the donor element, but promotes the separation of the image receiving layer from the receiver support upon transfer, for example by lamination, of the color image to a permanent support. The color image is thus between the permanent support (e.g., glass or polarizing element) and the image receiving layer. The image receiving layer can act as a planarizing layer for the LCD device. Examples of materials suitable for use as the release layer include polyamides, silicones, vinyl chloride polymers and copolymers, vinyl acetate polymers and copolymers and plasticized polyvinyl alcohols. The release layer can have a thickness in the range of 1 to 50 microns. A cushion layer that is a deformable layer may also be present in the receiver element, typically between the release layer and the receiver support. The cushion layer may be present to increase the contact between the receiver element and the donor element when assembled. Examples of suitable materials for use as the cushion layer include copolymers of styrene and olefin monomers such as styrene/ethylene/butylene/-styrene, styrene/butylene/styrene block copolymers, and other elastomers. An adhesive layer may be present between the cushion layer and the release layer or between the cushion layer and the image receiving layer. Examples of suitable adhesives include hot melt adhesives such as ethylene vinyl acetate. Receiving elements suitable for use in color filter array applications are disclosed as transfer elements in U.S. Pat. No. 5,565,301 which is hereby incorporated by reference. Typical polymers for the receiver layer are (meth) acrylic polymers, including, but not limited to, acrylate homopolymers and copolymers, methacrylate homopolymers and copolymers, (meth)acrylate block copolymers, and (meth)acrylate copolymers containing other comonomer types, such as styrene. Alternate receiver elements are disclosed in U.S. Pat. No. 5,534,387. Alternately, the image receiving layer may also contain a low molecular weight crosslinkable binder similar to that described above.

Typically, the surface of the image receiving layer may be roughened to improve its function. Methods of roughening the surface of the image receiving layer include micro-roughening. Micro-roughening may be accomplished by any suitable method. One specific example, is by bringing it in contact with a roughened sheet typically under pressure and heat. The pressures used are preferably less than about 8 MPa. Optionally, heat may be applied up to about 80 to about 88° C. more typically about 54° C. for polycaprolactone polymers and about 94° C. for poly(vinylacetate) polymers, to obtain a uniform micro-roughened surface across the image receiving layer. Alternatively, heated or chilled roughened rolls may be used to achieve the micro-roughening.

It is important that the means used for micro-roughening of the image receiving layer has uniform roughness across its surface. Typically the average roughness (Ra) as determined with a Wyko Profilometer (Wyko Model NT 3300, Veeco Metrology, Tucson, Ariz.)) should yield values less than about 0.6 micron.

Permanent Substrate

Figure 4:
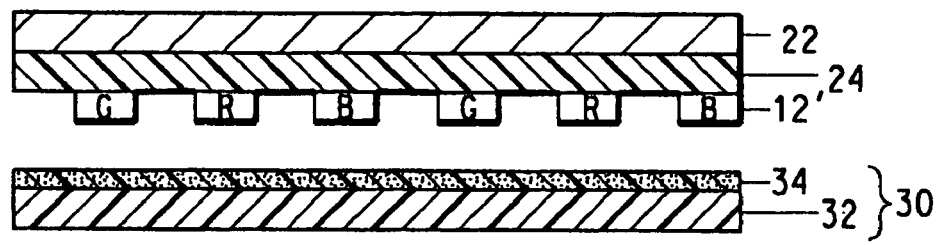
FIG. 4 illustrates the receiver element of FIG. 2 after exposure and separation from the donor element, wherein the receiver element carries a color image transferred from the thermally imageable layer of the donor element, and the transfer of said color image to a permanent substrate.

In the intermediate transfer process, the permanent substrate (30) used in step (3) of the process, which comprises a support (32) and a treatment or coating (34), as shown in FIG. 4, must be optically transparent. Some examples include transparent plastic films such as polyethylene terephthalate and polyimide, glass, treated glass and composites thereof, or rigid plastic such as polycarbonate or poly(4-methylpentene). Thin glass substrates (0.5–1.0 mm thick) may be typically used.

The treatment or coating (34) may be selected from the group consisting of a polycarbonate; a polyurethane; a polyester; polyvinyl chloride; styrene/acrylonitrile copolymer; poly(caprolactone); vinylacetate copolymers with ethylene and/or vinyl chloride; (meth)acrylate homopolymers (such as butyl-methacrylate) and copolymers; and mixtures thereof. This layer may be present in any amount effective for the intended purpose. In general, good results have been obtained at coating weights of about 1 to about 5 g/m².

In the direct transfer process, the receiver element in step (2) is the permanent substrate (30). The receiver support (22) and an optional image-receiving layer (24) comprise the materials described above for the permanent substrate (30) and the treatment or coating thereon.

It may also be advantageous to employ a substrate that incorporates a pre-formed black mask pattern. Typically, a pre-formed black mask is used in the case of rigid glass or plastic substrates, and also can be employed with flexible permanent substrates or even with flexible intermediate receiver supports. The black mask, which serves to delineate the colored (e.g. RGB) pixel structure of the color filter, may be prepared in various ways. One method of preparing the black mask may employ thermal imaging donors of the type described herein. In this case the process of constructing the black mask follows the processes described for imaging of the colored donor films to either intermediate or permanent substrates, with or without the optional image receiving layer.

It is also possible to use a black mask that is preformed on the permanent substrate by alternate conventional means well known to those skilled in the art. An example of a conventional method of producing a black mask is a photolithographic process involving optical exposure of a photoresist through an exposure mask. The black mask may be typically formed following additional processing steps (e.g. etching, washing, stripping, etc.). When employing a conventional pre-formed black mask, the colored thermal donor elements are exposed and transfer an image to the permanent substrate (30) with preformed black mask in precise alignment to the preformed black mask. This process results in an 'hybrid' color filter employing conventional black mask and thermal color pattern. The advantage of using a preformed black mask is that this process offers improved ease of integration into existing LCD manufacturing processes. The preformed black mask also takes advantage of the inherently much higher resolution of optical lithographic processes in comparison to the thermal transfer process. A high resolution black mask can serve to decrease the resolution requirement of the colored portions of the color filter pattern as the lower resolution edges of the color patterns are hidden by the black mask. Transfer of the colored donors in alignment with a preformed black mask may require modification of the thermal imaging equipment to allow a means for aligning the preformed black mask to the writing locations of the imager.

Typically a preformed conventional black mask pattern may be composed of either thin (ca. 0.1–0.3 microns) inorganic materials (e.g. chromium, chromium oxide, etc.) or of organic black pigmented resist (organic black mask). In the case of an organic black mask, typical thicknesses of the black mask layer may be in the range of 0.5–3.0 microns. Generally if the treatment or coating is present with a conventionally prepared preformed black mask, the treatment or coating will be the outermost layer of the permanent substrate (30) and will completely cover the preformed black mask.

Process

Figure 5A:
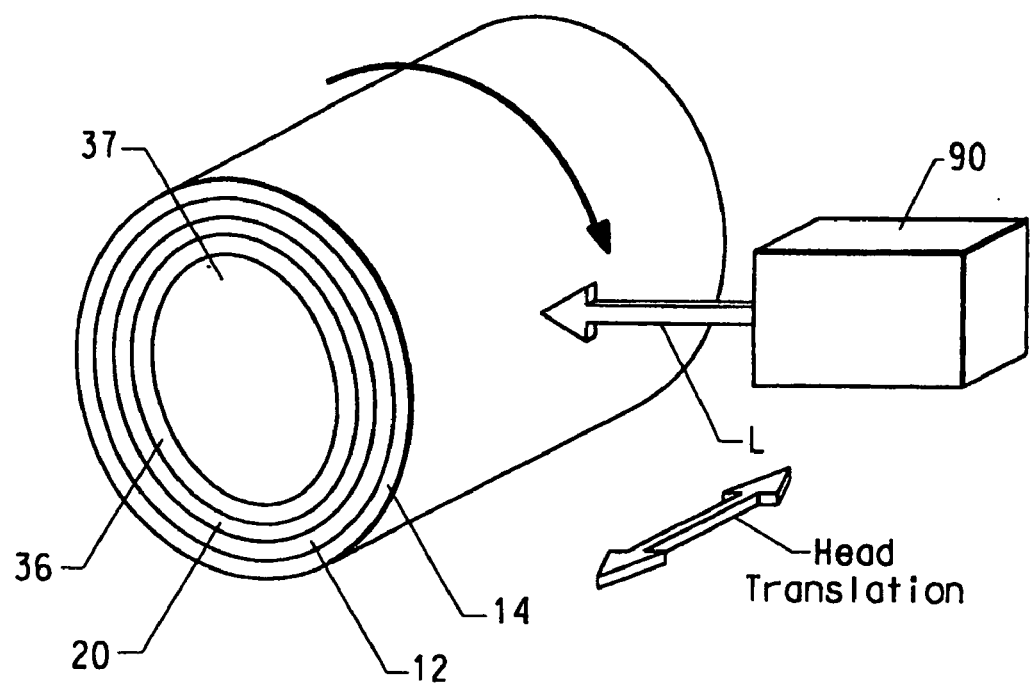
FIG. 5a is the layout of a drum type thermal imager.
Figure 5B:
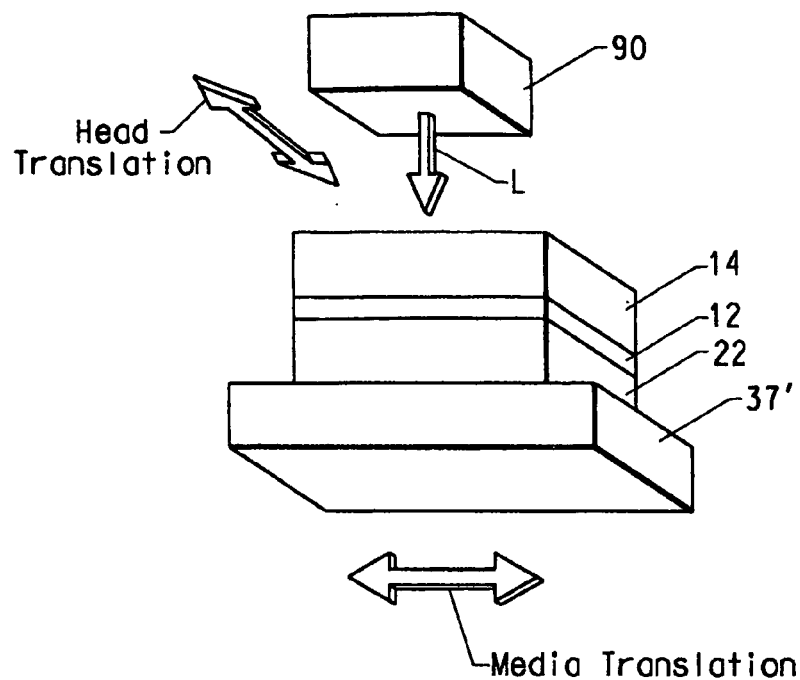
FIG. 5b is the layout of a flat bed thermal imager.

As shown in FIGS. 2, 5a and 5b, the outer surface of the thermally imageable layer (12) of the donor element (10) is brought into close proximity with the image receiving layer (24) of the receiving element (20) to form the assemblage (25). Vacuum and/or pressure can be used to hold the donor element (10) and the receiver element (20) together to form the assemblage (25). As another alternative, the donor element (10) and receiver element (20) can be taped together and taped to the imaging apparatus. A pin/clamping system can also be used. Alternatively, the surface of the donor element and/or the receiver element may be roughened during coating by laminating a matte polyethylene coversheet. This serves improve the average uniformity of the contact between the donor element (10) and the receiver element (20), by facilitating the evacuation of air from between the donor element (10) and the receiver element (20).

The assemblage (25) is then exposed through the donor element (10) in selected areas by radiation (L) in the form of heat or light. As mentioned above, the exposure pattern is the desired pattern of the color filter. The optional heating layer (16) or the thermally imageable layer absorbs the radiation (L), generating heat which causes transfer of the heat-exposed portions of the thermally imageable layer (12) to the receiver element (20).

After exposure, the donor element (10) is separated from the receiver element (20). This may be done by peeling the two elements apart. Very little peel force is typically required; the donor support (10) may simply be separated from the receiver element (20). Any conventional manual or automatic separation technique may be used.

Best quality imaging results are obtained when the process of separating the donor and receiver is performed with a consistent peel speed and radius of curvature with the direction of peeling oriented parallel to the color filter stripe pattern.

After separation of the donor element (10) and the receiver element (20), the color image is transferred to the receiver element, while the unexposed, unwanted portions of the thermally imageable layer (12) remain on the donor element, The radiation (L) is typically provided by a laser (90). Laser radiation may be provided at a laser fluence of up to about 1 J/cm$^2$, preferably about 75–500 mJ/cm$^2$. Other techniques that generate sufficient heat to cause transfer of the colorant material layer may be used, as well. For example, a thermal print head, or microscopic arrays of metallic tips with diameters ranging from about 50 nanometers, such as those used in atomic force microscopy, diameters ranging to about 5 microns, may also be used. An electric current is provided to the metallic tips to generate the heat.

Various types of lasers may be used to expose the thermally imageable layer (12) of colorant material. The laser preferably emits in the infrared, near-infrared or visible region. Particularly advantageous are diode lasers emitting in the region of 750 to 870 nm which offer a substantial advantage in terms of their small size, low cost, stability, reliability, ruggedness and ease of modulation. Diode lasers emitting in the range of 780 to 850 nm are most preferred. Such lasers are available from, for example, Spectra Diode Laboratories, San Jose, Calif. Other types of lasers may also be used, as is known in the art, providing that the absorption of the heating layer (16) matches the emitting wavelength of the laser.

As shown in FIG. 5a, if the donor element (10) and the receiver element (20) are both flexible, the assembly (25) can be conveniently mounted on a drum (37) to facilitate laser imaging.

Figure 3:
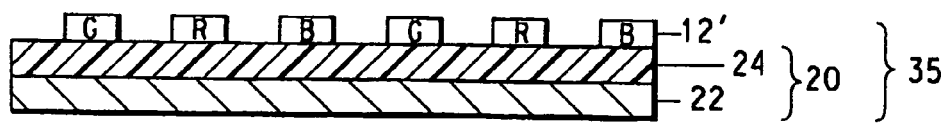
FIG. 3 illustrates the receiver element of FIG. 2 after exposure and separation from the donor element, wherein the receiver element comprises a receiver support, which may be glass, and carries a color image transferred from the thermally imageable layer of the donor element.
Figure 7:
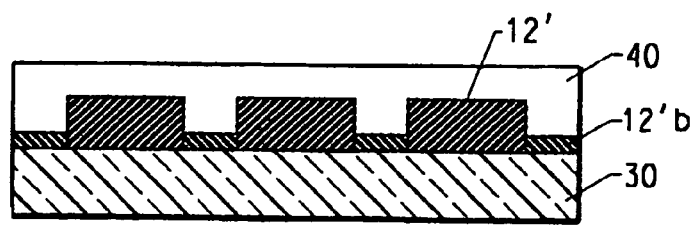
FIG. 7 shows a schematic cross-section of the color filter pattern on glass showing the arrangement of the planarizing layer.

The transfer step can be repeated with the same receiver element bearing the first color image (12') and one or more different donor elements having a colorant of a different color, to prepare a multicolor color filter pattern. If the receiver support is the permanent substrate, this forms a color filter (35) as shown in FIG. 3 and FIG. 7. Optionally, an additional adhesive layer (not shown) may be present on the permanent substrate, e.g., glass, before transfer As best seen in FIG. 4, if the receiver element is an intermediate transfer element, the next step in the process of the invention is to transfer the color image (12') from the receiver element to a permanent substrate, such as glass. After formation of the color image (12'), which may be a single color or multicolor image, on the receiver element (20), the receiver element (20), including the color image (12'), is brought into contact with a permanent substrate (30), as shown in FIG. 4. The substrate (30) may include a base element (32) and an adhesive coating (34) to increase the adhesion of the patterned layer (12') to the substrate. The adhesive coating (34) may be a suitable polycarbonate, a polyurethane, a polyester, polyvinyl chloride, styrene/acrylonitrile copolymer, poly(caprolactone), vinylacetate copolymers with ethylene and/or vinyl chloride, (meth) acrylate homopolymers (such as butyl-methacrylate), copolymers, and mixtures thereof. Alternately, an image receiving layer similar to that described above, for the receiving element, may be applied to the permanent substrate, by laminating a separate receiving element to the permanent substrate and removing, e.g. peeling, the receiver support, prior to transferring the color image to the permanent substrate.

It is important that the surface of the substrate (30) adjacent the color image have greater adhesion to the color image (12') than the adhesion of the color image and image receiving layer to the receiver support. The substrate (30) may be any material that will support the subsequent layers and transmit light generated by the LCD display. Suitable materials include transparent plastic films, as described above, glass, and composites. Thin glass substrates are preferred. Glass as thin as 50 microns can be used. The upper limit on thickness is set by the weight and desired properties of the end product. The thickness is usually less than 5 millimeters. Typical values are from 0.5–1.0 mm.

Preferably, the color image (12') is transferred to the substrate (30) by lamination. Nip or press lamination may be used, as is known in the art. A roll-to-roll HRL-24 Laminator, manufactured by DuPont, Wilmington, Del., is typically used to accomplish the lamination. The minimum useful pressure is about 210 kPa. The maximum pressure is determined by the pressure at which unwanted contamination, such as a speck of dust, can cause the substrate to crack. Generally the pressure should be less than about 69 MPa. After separation of the donor element (10) from the substrate (30), the color image (12') is transferred to the substrate to form a color filter element (35).

Planarizing Layer

The next step in the process of the invention is to apply an optional planarization layer (40) to the so formed color filter.

The optional planarization layer (40) protects the underlying color filter element and smoothes and/or levels the surface. Materials useful as planarization layers are well known, and generally include polymeric materials which may be crosslinkable or thermally curable. Some examples of suitable materials include homopolymers and copolymers of (meth)acrylate esters, such as polyacrylate and polymethylmethacrylate, and their substituted analogs; copolymers of styrene and (meth)acrylate esters, such as styrene/methyl-methacrylate; copolymers of styrene and olefin monomers, such as styrene/ethylene/butylene; copolymers of styrene and acrylonitrile; fluoropolymers; copolymers of (meth)acrylate esters with ethylene and carbon monoxide; polycarbonates; polysulfones; polyurethanes; polyesters; and polyimides. The monomers for the above polymers can be substituted or unsubstituted. Mixtures of polymers can also be used. Thermoset materials such as epoxy and amino resins can also be used. Preferred materials for the planarization layer are copolymers of methyl methacrylate, butyl methacrylate, methacrylic acid, and glycidyl methacrylate. Low molecular weight polymers are typical for the planarization layer because of their increased flow under stress. Alternately, the planarizing layer may also contain a low molecular weight crosslinkable binder similar to that described above. In another embodiment, the image receiving layer (24) that is transferred with the color image (12') of colorant material may function as the planarizing layer.

Alternately, the planarizing layer may have a crosslinkable binder having a weight average molecular weight of about 20,000 to about 110,000, more typically about 30 to about 100,000, and still more typically about 50,000 to about 85,000 and a composition similar to that described earlier for the crosslinkable binder in the thermally imageable layer of the donor element.

Figure 8:
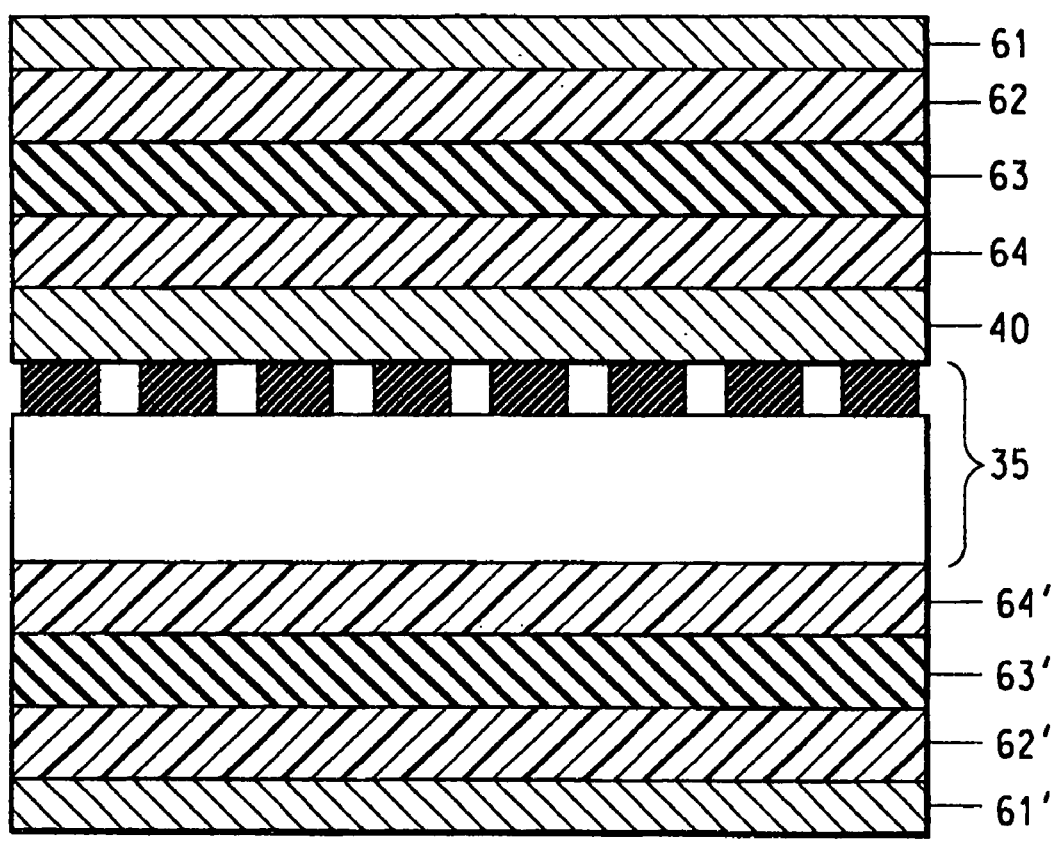
FIG. 8 is an illustration of the lamination stack used for lamination of the planarizing layer to the color filter in a press.

The optional planarization layer (40) may be applied using any conventional coating technique. Such techniques are well known in the art and include spin coating, casting, gravure printing, and extrusion coating processes. The planarization layer can also be applied as a preformed film by lamination to the color filter element (35) as shown in FIG. 8, wherein a stack comprising a rigid plate (61) such as a stainless steel plate; a release element (62) such as a Teflon® sheet; a flexible compressible element (63) such as a fiber reinforced rubber sheet; a polyester sheet (64); the planarizing element having a planarizing layer (40); color filter (35) with the color filter pattern adjacent the planarizing layer (40); a polyester sheet (64') adjacent the glass substrate of the color filter; a flexible compressible element (63') such as a fiber reinforced rubber sheet; a release element (62') such as a Teflon® sheet; and a rigid plate (61') such as a stainless steel plate; is placed in a vacuum laminator and the chamber evacuated before lamination of the planarizing layer to the color filter element (35) occurs.

Liquid Crystal Display

Figure 1:
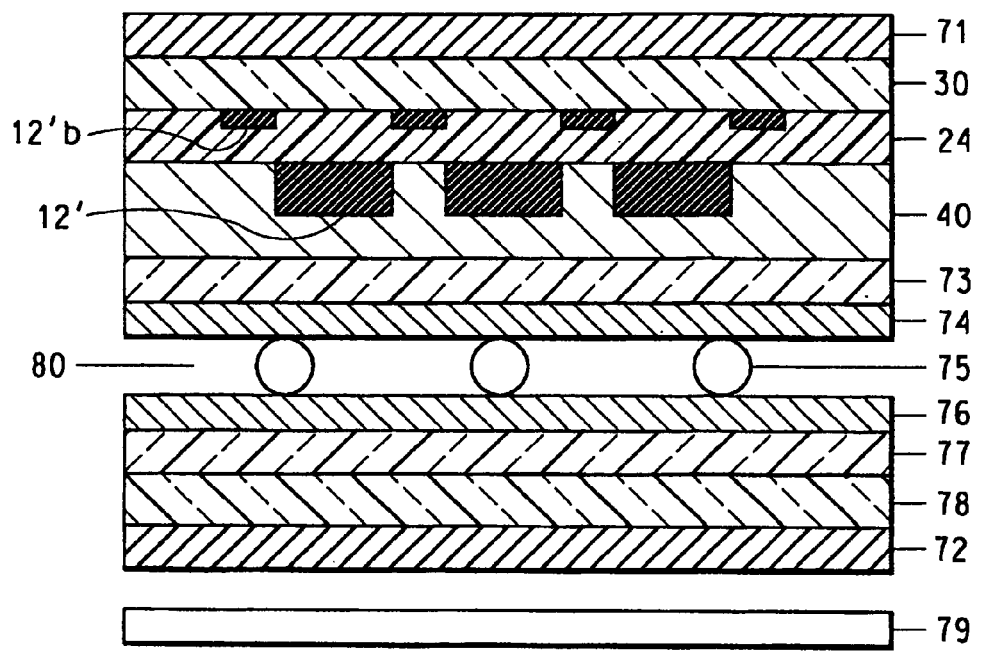
FIG. 1 is a schematic cross sectional view of an LCD display incorporating the color filter of this invention.

A simplified schematic representation of a liquid crystal display and color filter are shown in FIG. 1. The liquid crystal display comprises two panels. The upper panel comprises a first polarizer (71), a glass or other rigid substrate (30), an optional adhesion layer (24), a black matrix (12'b) formed by either conventional lithographic techniques, via thermal printing or by other means. The materials comprising the black matrix may be either inorganic (e.g. Chromium, Chromium oxide, etc.) or organic (e.g. black pigmented photoresist). The upper plate further comprises the color filter layer comprising separate red, green and blue sub pixels (12'), an optional protective organic planarizing layer (40), a transparent electrical conductor (typically indium tin oxide) (73), and an alignment layer (74) which serves to template the liquid crystal orientation. The upper and lower plates are separated by rigid mechanical spacers (75) that maintain a fixed separation between the two plates and that further serve to define the cell wherein the liquid crystal solution is contained (80). The lower plate of the LCD display is comprised of a second alignment layer (76), transparent conductor (77) and glass or other rigid material as substrate (78) and finally a second polarizer (72). Not shown in the schematic diagram are the drive electronics that control the orientation of the liquid crystal. Typical modern LCD displays employ an array of thin film transistor circuits (not shown) (one circuit for each RGB sub-pixel) which are fabricated on the lower plate of the LCD display. Finally, a backlight (79) is located below the lower plate to provide illumination of the display. LCD displays employing reflected ambient illumination may also be used with the color filters of this invention.

EXAMPLES

These non-limiting examples demonstrate the processes and products claimed and described herein. All temperatures throughout the specification are in ° C. (degrees Centigrade) and all percentages are weight percentages unless indicated otherwise.

Glossary:

| Abbreviation | Description | Source |
|---|---|---|
| Zonyl® FSA | fluoro surfactant; 25% solids in water and isopropanol, [CAS No. 57534-45-7] A lithium carboxylate anionic fluorosurfactant having the following structure: RfCH2CH2SCH2CH2CO2Li where Rf = F(CF2CF2)x and where x = 1 to 9 | DuPont, Wilmington, DE |
| Melinex® 573 | 102 micron clear PET base | DuPontTeijin Films ™, a joint venture of E. I. du Pont de Nemours & Company |
| Melinex® LJX-111 | Clear PET film base | DuPontTeijin Films ™, a joint venture of E. I. du Pont de Nemours & Company |
| Corning 1737 | display grade glass | Corning Glass Company, Corning, NY |
| VAZO® 67 | | DuPont, Wilmington, DE |
| CRONAR® 471X | | DuPont, Wilmington, DE |
| ELVAX® 550 | | DuPont, Wilmington, DE |
| POLYSTEP B-7 | Ammonium lauryl sulfate | Stepan Co., Northfield, IL |
| Butyl Cellosolve [111-76-2] | 2-butoxyethanol | Aldrich, Milwaukee, WI |
| 2-amino-2-methyl-1-propanol [124-68-5] | | Aldrich, Milwaukee, WI |
| N,N-dimethyl-ethanolamine (DMEA) [108-01-0] | | Aldrich, Milwaukee, WI |
| Irgalite® Green 6G | | Ciba, Newport, DE. |
| Chromophthal® Red 3B | | Ciba, Newport, DE. |
| MAA | Methacrylic acid | Aldrich, Milwaukee, WI |
| BzMA | benzyl methacrylate | Aldrich, Milwaukee, WI |
| ETEGMA | Triethyleneglycol ethyl ether methacrylate | |
| POEA | 2-phenoxyethyl acrylate | Aldrich, Milwaukee, WI |
| nBA | n-butyl acrylate | Aldrich, Milwaukee, WI |
| AA | acrylic acid | Aldrich, Milwaukee, WI |
| MA | methyl acrylate | Aldrich, Milwaukee, WI |
| Joncryl® 63 | Aqueous 30% solids solution of a styrene acrylic polymer (Joncryl® 67) with a number average molecular weight of 8200 and weight average molecular weight of 12000. | Johnson Polymer, Sturtevant, WI |
| Carboset® XPD-2091 | Aqueous 43% solids solution of a styrene acrylic resin with weight average molecular weight 3250. | Noveon, Avon Lake, OH |
| Aerotex® 3730 | Aqueous 85% solution of a melamine-formaldehyde crosslinking agent | Noveon, Avon Lake, OH |

Pigment Dispersions

The commercially available aqueous pigment dispersions listed in Table 1 were obtained from Penn Color Inc. (Hatfield, Pa.).

TABLE 1

Pigment dispersions.

| Color | Dispersion | Pigment | P/D | % Solids |
|---|---|---|---|---|
| Blue | 32S195 (PD-B1) | Pigment Blue 15:6 | 2.0 | 50.5% |
| Green | 32G200 (PD-G1) | Pigment Green 36 | 2.3 | 50.0% |
| Red | 32R194 (PD-R1) | Pigment Red 177 | 1.5 | 45.0% |
| Red | 32R238D (PD-R5) | Pigment Red 254 | 1.5 | 40.0% |
| Violet | 32S212 (PD-V1) | Pigment Violet 23 | 2.3 | 48.5% |
| Violet | 32S168D (PD-V2) | Pigment Violet 23 | 2.0 | 20.7% |
| Yellow | 32Y213D (PD-Y2) | Pigment Yellow 74 | 1.5 | 42.0% |
| Yellow | 32Y145D (PD-Y1) | Pigment Yellow 83 | 2.3 | 40.0% |

Additional commercially available raw materials required for preparation of the donor element are summarized in Table 2.

TABLE 2

| Material | Abbreviation | Source |
|---|---|---|
| Ammonium hydroxide | — | |
| 2-[2-[2-chloro-3-[[1,3-dihydro-1,1-dimethyl-3-(4-sulfobutyl)-2H-benz[e]indol-2-ylidene]ethylidene]-1-cyclohexen-1-yl]ethenyl]-1,1-dimethyl-3-(4-sulfobutyl)-1H-benz[e]indolium, inner salt | NIR-1 | H. W. Sands (Jupiter, FL) |
| Zinpol® 20 | PR-7 | Noveon, Cleveland, OH |

Tg (Glass transition temperature) values reported are mid-point temperatures in degrees Centigrade from DSC scans recorded according to ASTM D3418-82.

Molecular weights were measured by standard gel permeation chromatography (GPC) by standard techniques vs. poly(methyl methacrylate) standards in THF solution.

Dynamic light scattering was performed using Brookhaven Instrument BI-9000AT digital correlator (Brookhaven Instruments, Brookhaven, N.Y.). An argon-ion laser with wavelength 488 nm and power 200 mW was used. Measurements were made at room temperature with scattering angle 60°. The samples were diluted 200 µL into 20 mL water then again 100 µL into 20 mL water, and then filtered with 0.45 micron filter. The results are reported as diameter (particle size) in nm units. For general discussions of the determination of particle sizes by quasielastic light scattering, see Paint and Surface Coatings: Theory and Practice, ed. By R. Lombourne, Ellis Horwood Ltd., West Sussex, England, 1987, pp. 296–299, and The Application of Laser Light Scattering to the Study of Biological Motion, ed. By J. C. Earnshaw and M. W. Steer, Plenum Press, NY, 1983, pp. 53–76.

Solids content was measured by putting about 5 grams of acrylic latex in a tared, 5-cm aluminum pan, which was placed in a 75° C. vacuum oven at about 400 mm Hg vacuum for 1 to 2 days. Percent solids was calculated by dividing the final sample weight by the initial sample weight.

Coating weights were measured by cutting out and weighing a 1 dm² piece of film, removing the coating by rubbing with a paper towel moistened in either methanol or acetone, drying the film for several minutes, and reweighing. Coating weights are the difference in weights of the before and after film in mg, units: mg/dm².

Additional Pigment Dispersions

Pigment dispersions were prepared as described below. The pigment compositions of these dispersions are summarized in Table 3.

TABLE 3

Summary of pigment dispersion compositions.

| Designation | Pigment | P/D |
|---|---|---|
| PD-G2 | Pigment Green 36 | 1.5 |
| PD-G3 | Pigment Green 36 | 3.0 |
| PD-K1 | Degussa W6220 Carbon Black | 2.0 |
| PD-R3 | Pigment Red 149 | 1.5 |
| PD-R4 | Pigment Red 177 | 1.5 |
| PD-Y3 | Pigment Yellow 83 | 1.5 |

Pigment Dispersions PD-K1, PD-G2 and PD-G3:

The PD-K1 pigment dispersion was prepared from Degussa W6620 carbon black and DR-3. The pigment dispersion was prepared at 15% solids with a pigment to dispersant ratio (P/D) of 2.0, according to the procedures described in U.S. Pat. No. 5,231,131, Chu: A mixture of 323.08 grams of water, 33.30 grams of dispersant solution, and 3.62 grams of 2-amino-2-methyl-1-propanol was charged, along with 40.00 grams of Degussa W6220 carbon black, to an attritor (Apollo® Trick Titanium, Troy, Mich.). The attritor contained 850 grams of 0.8–1.0 micron zirconia media. The mixture was processed for 22 hours, keeping the temperature below 38° C. Filtration through a 1 micron filter produced the pigment dispersion.

Dispersions PD-G2 and PD-G3 were prepared in the same manner as PD-K1 using the materials and conditions shown in Table 4.

TABLE 4

Materials and conditions for preparation of pigment dispersions PD-G2 and PD-G3

| Condition | PD-G2 | PD-G3 |
|---|---|---|
| Pigment | Irgalite ® Green 6G | Irgalite ® Green 6G |
| Dispersant | DR-3 | DR-3 |
| Pigment to Dispersant Ratio | 1.5 | 3.0 |
| Milling time (hrs) | 6 | 6 |

PD-R3

Red pigment dispersion PD-R3 was prepared with structured acrylic dispersant DR-1 and PV Fast Red B pigment (Clariant Corp., Coventry, R.I.) at a pigment to dispersant ratio of 1.5. The dispersion was prepared using a 2-roll mill (Lehmann Mills 6×18 Laboratory Mill). Samples of the above described combination of pigment and dispersant were prepared and milled with diethylene glycol employed as a milling aid. After an appropriate amount of milling time to achieve a uniform mixing, the material was removed from the mill and allowed to cool to room temperature at which point the material was very brittle and easily crushed with a mortar and pestle. Typical solids of this chip product were 86 to 92% with the balance of the solid present as diethylene glycol.

The isolated chip was then dissolved in water. For this step the chip is agitated at high speed with DMEA to neutralize the dispersant. The chip was dissolved at approximately 38.5% solids (w/w). After the chip was completely dissolved, the solution was diluted with water to 25% solids (w/w) for use donor sheet formulations.

PD-R4

Red pigment dispersion PD-R4 was prepared using Chromophthal® Red 3B pigment and dispersant DR-4 at a pigment to dispersant ratio of 1.5. The dispersion was prepared using a horizontal media mill (Eiger Laboratory "Mini" 250 Mill). Samples of the above described combination of pigment and dispersant were prepared and milled in water at a pigment grind solids varying from 20% pigment to 30% pigment with good results. After milling for sufficient time to attain good particle size reduction, the dispersion was diluted with water to 25% solids (w/w) for use in donor sheet formulations.

PD-Y3

Yellow pigment dispersion PD-Y3 was prepared using SpectraPAC® W Chromafine® Yellow 2727 pigment (Sun Chemical) and dispersant DR-2 at a pigment to dispersant ratio of 1.5. The dispersion was prepared using a horizontal media mill (Eiger Laboratory "Mini" 250 Mill). Samples of the above described combination of pigment and dispersant were prepared and milled in water at a pigment grind solids varying from 20% pigment to 30% pigment with good results. After milling for sufficient time to attain good particle size reduction, the dispersion was diluted with water to 25% solids (w/w) for use in donor sheet formulations.

Dispersing Resins

Dispersing Resins DR-1 and DR-4

Pigment dispersants were prepared by group transfer polymerization techniques as described in U.S. Pat. No. 5,772,741, Spinelli, to form block copolymers of the monomer compositions shown in Table 5A. The nomenclature used in the table indicates that the monomers listed before the // were mixed, added to the initiator, and then the monomers after the // were added. Dispersant DR-1 was used to make pigment dispersions in the tetrahydrofuran solvent in which it was prepared, while dispersant DR-4 was solvent-exchanged with 2-pyrrolidone before use.

TABLE 5

Composition information for GTP dispersing resins.

| Dispersing Resin | Monomer Components | Monomer Composition | Solvent |
|---|---|---|---|
| DR-1 | BzMA//MAA | 13//10 | tetrahydrofuran |
| DR-4 | BzMA//MAA/ ETEGMA | 13//13/7.5 | 2-pyrrolidone |

Dispersing Resins DR-2 and DR-3

Pigment dispersants were prepared by the cobalt chain transfer graft copolymer methods as described in U.S. Pat. No. 5,231,131, Chu, et. al. Compositions are listed in Table 5B. For each dispersing resin, the composition before the -g- was polymerized by cobalt chain transfer polymerization to an oligomer with a polymerizable group at the end. This oligomer was then copolymerized with the remaining monomer mixture to form a graft copolymer. The DR-2 pigment dispersant was then solvent-exchanged to produce a solution in 2-pyrrolidone.

TABLE 5B

Composition information for SCT dispersing resins.

| Dispersing Resin | Polymer Components | Monomer Composition | Solvent |
|---|---|---|---|
| DR-2 | POEA-g-ETEGMA/MAA | 66-g-4/30 | 2-pyrrolidone |
| DR-3 | (69)nBA/MA/AA-g-(31)MMA/MAA | (45.5/45.5/9)-g-(28.75/71.25) | Methyl ethyl ketone/isopropanol |

Polymer Resins

PR-3

Polymer resin, PR-3 was prepared by thoroughly mixing PR-5 and PR-6 in a ratio of 85:15 by weight.

Chain Transfer Agent Solution

A chain transfer agent solution (CTA-1) used in the following acrylic latex synthesis was prepared as described by the methods of U.S. Pat. No. 5,362,826, Berge, et. al. and U.S. Pat. No. 5,324,879, Hawthorne.

A 500-liter reactor was equipped with a reflux condenser and nitrogen atmosphere. The reactor was charged with methyl ethyl ketone (42.5 kg) and isopropyl-bis(borondifluorodimethylglyoximato) cobaltate (III) (Co III DMG) (104 g) and the contents brought to reflux. A first mixture of Co III DMG (26.0 g), methyl methacrylate (260 kg), and methyl ethyl ketone (10.6 kg) was added in a first feed to the reactor at a constant rate over a total period of 4 hours. Starting at the same time as the start of the first feed, a second mixture of VAZO® 67 (5.21 kg) and methyl ethyl ketone (53.1 kg) was added in a second feed to the reactor at a constant rate over a total period of 5 hours. After the completion of the second feed in 5 hours, the reactor contents were kept at reflux for a further 30 minutes. After cooling to ambient temperature, a 70 wt % solids solution of the chain transfer agent was obtained.

AR-1

A 3-liter, round bottom flask was equipped with a condenser, addition funnel, initiating solution inlet port, mechanical stirrer, heater and temperature controller probe, with the contents maintained under a nitrogen atmosphere. The flask was charged with 700 grams of deionized water and 6.90 grams of POLYSTEP B-7. A first initiating solution of 0.40 grams ammonium persulfate in dissolved in 100 mL of deionized water was prepared. A first monomer blend of 66.0 grams methyl methacrylate, 4.0 grams glycidyl methacrylate, and 110.0 grams n-butyl acrylate was prepared and placed in the addition funnel. A second monomer blend of 66.0 grams methyl methacrylate, 4.0 grams glycidyl methacrylate, 110.0 grams n-butyl acrylate, and 40.0 grams of methacrylic acid was prepared. While stirring, the contents of the reaction flask was heated to 85 degrees Centigrade and maintained at that temperature, within a range of 3 degrees centigrade, through the following steps.

The synthesis of the acrylic latex was initiated by the first addition to the flask of 80 mL of the first initiating solution, followed within one minute by the second addition of 20 mL of the first monomer blend from the addition funnel. These two additions were complete in less than one minute. The remaining portion of first monomer blend in the addition funnel was added to the flask, beginning within two minutes, at a constant rate over a period of 60 minutes. At the end of the addition of the first monomer blend, the second monomer blend was promptly added within two minutes to the addition funnel and immediately thereafter was added to the flask at a constant rate over a period of 60 minutes total. When the addition of the second monomer blend was complete, the remaining initiating solution was promptly added in less than one minute. Stirring of the contents of the flask at 85 degrees Centigrade plus or minus 3 degrees Centigrade was maintained for 30 minutes after the completion of the addition of the initiating solution. Thereafter the contents of the reaction flask were cooled to ambient temperature and filtered through a fine paint strainer, (Paul N. Gardner Company, Inc. Pompano Beach, Fla., Item number ST-F 60×48 mesh) to provide the acrylic latex.

The acrylic latex had particle size 88 nm, 33.5% solids, and Tg 4° C.

PR-1, PR-2 and PR-4

An acrylic latex (PR-1) of a controlled molecular weight polymer resin was prepared as detailed below using the CTA-1 according to the method in U.S. Pat. No. 5,773,534, Antonelli, et. al. PR-4 was prepared by the same method using the composition shown in Table 6. A high molecular weight polymer resin (PR-2) was prepared by the same method omitting the chain transfer agent and the composition shown in Table 6.

A 3-liter, round bottom flask was equipped with a condenser, addition funnel, initiating solution inlet port, mechanical stirrer, heater and temperature controller probe, with the contents maintained under a nitrogen atmosphere. The flask was charged with 700 grams of deionized water and 6.90 grams of POLYSTEP B-7. A first initiating solution of 0.40 grams ammonium persulfate dissolved in 100 mL of deionized water was prepared. A first monomer blend of 122 grams methyl methacrylate, 4.0 grams glycidyl methacrylate, 60.0 grams n-butyl acrylate and 8.0 grams CTA-1 was prepared and placed in the addition funnel. A second monomer blend of 122.0 grams methyl methacrylate, 4.0 grams glycidyl methacrylate, 60 grams n-butyl acrylate, 12.0 grams of methacrylic acid and 8.0 grams CTA-1 was prepared. While stirring, the contents of the reaction flask were heated to 85° C. and maintained at that temperature, within a range of 3° C., through the following steps.

The synthesis of the acrylic latex was initiated by the first addition to the flask of 80 mL of the first initiating solution, followed within one minute by the second addition of 20 mL of the first monomer blend from the addition funnel. These two additions were completed in less than one minute. The remaining portion of first monomer blend in the addition funnel was added to the flask, beginning within two minutes, at a constant rate over a period of 60 minutes. At the end of the addition of the first monomer blend, the second monomer blend was promptly added within two minutes to the addition funnel and immediately thereafter was added to the flask at a constant rate over a period of 60 minutes total. When the addition of the second monomer blend was complete, the remaining initiating solution was promptly added in less than one minute. Stirring of the contents of the flask at 85° C. plus or minus 3° C. was maintained for 30 minutes after the completion of the addition of the initiating solution. Thereafter the contents of the reaction flask were cooled to ambient temperature and filtered through a fine paint strainer, (Paul N. Gardner Company, Inc. Pompano Beach, Fla., Item number ST-F 60×48 mesh) to provide the acrylic latex PR-1. Properties of this latex are summarized in Table 6.

The compositions (weight fraction charged to the reactor) and analytical data for the polymer resins are summarized in Table 6. Compositions of the polymers are in weight percent on polymer solids based on the Chain Transfer Agent, MMA, BA, MAA, and GMA.

TABLE 6

Composition and Analytical Data for Polymer Resins.

| Resin | Solids | CTA-1 | MMA | BA | MAA | GMA | Particle Diameter (nm) | Tg (° C.) | Mn | Mw |
|---|---|---|---|---|---|---|---|---|---|---|
| PR-1 | 33.1 | 4 | 61 | 30 | 3 | 2 | 86 | 55 | $2.0 \times 10^4$ | $8.5 \times 10^4$ |
| PR-2 | 33.4 | 0 | 48 | 40 | 10 | 2 | 91 | 32 | — | — |
| PR-4 | 33.0 | 4 | 72 | 15 | 3 | 2 | 74 | 92 | $2.6 \times 10^4$ | $7.4 \times 10^4$ |

PR-5

A 3-liter, round bottom flask was equipped with a condenser, addition funnel, initiating solution inlet port, mechanical stirrer, heater and temperature controller probe, with the contents maintained under a nitrogen atmosphere. The flask was charged with 700 grams of deionized water and 6.90 grams of POLYSTEP B-7. A first initiating solution of 0.40 grams ammonium persulfate dissolved in 100 mL of deionized water was prepared. A first monomer blend of 90.0 grams methyl methacrylate, 4.0 grams glycidyl methacrylate, and 100.0 grams n-butyl acrylate was prepared and placed in the addition funnel. A second monomer blend of 90.0 grams methyl methacrylate, 4.0 grams glycidyl methacrylate, 100.0 grams n-butyl acrylate, and 12.0 grams of methacrylic acid was prepared. While stirring, the contents of the reaction flask were heated to 85° C. and maintained at that temperature, within a range of 3° C., through the following steps.

The synthesis of the acrylic latex was initiated by the first addition to the flask of 80 mL of the first initiating solution, followed within one minute by the second addition of 20 mL of the first monomer blend from the addition funnel. These two additions were complete in less than one minute. The remaining portion of first monomer blend in the addition funnel was added to the flask, beginning within two minutes, at a constant rate over a period of 60 minutes. At the end of the addition of the first monomer blend, the second monomer blend was promptly added within two minutes to the addition funnel and immediately thereafter was added to the flask at a constant rate over a period of 60 minutes total. When the addition of the second monomer blend was complete, the remaining initiating solution was promptly added in less than one minute. Stirring of the contents of the flask at 85° C. plus or minus 3° C. was maintained for 30 minutes after the completion of the addition of the initiating solution. Thereafter the contents of the reaction flask were cooled to ambient temperature and filtered through a fine paint strainer, (Paul N. Gardner Company, Inc. Pompano Beach, Fla., Item number ST-F 60×48 mesh) to provide the acrylic latex PR-5.

This acrylic latex had particle size 81 nm, 33.3% solids, and Tg 113° C.

PR-6

A 3-liter, round bottom flask was equipped with a condenser, addition funnel, initiating solution inlet port, mechanical stirrer, heater and temperature controller probe, with the contents maintained under a nitrogen atmosphere. The flask was charged with 700 grams of deionized water and 6.90 grams of POLYSTEP B-7. A first initiating solution of 0.20 grams ammonium persulfate dissolved in 100 mL of deionized water was prepared. A first monomer blend of 10.0 grams methyl methacrylate, 20.0 grams styrene, 4.0 grams glycidyl methacrylate, and 160.0 grams n-butyl acrylate was prepared and placed in the addition funnel. A second monomer blend of 10.0 grams methyl methacrylate, 20.0 grams styrene, 4.0 grams glycidyl methacrylate, 160.0 grams n-butyl acrylate, and 12.0 grams of methacrylic acid was prepared. While stirring, the contents of the reaction flask were heated to 85° C. and maintained at that temperature, within a range of 3 degrees centigrade, through the following steps.

The synthesis of the acrylic latex was initiated by the first addition to the flask of 80 mL of the first initiating solution, followed within one minute by the second addition of 20 mL of the first monomer blend from the addition funnel. These two additions were complete in less than one minute. The remaining portion of first monomer blend in the addition funnel was added to the flask, beginning within two minutes, at a constant rate over a period of 60 minutes. At the end of the addition of the first monomer blend, the second monomer blend was promptly added within two minutes to the addition funnel and immediately thereafter was added to the flask at a constant rate over a period of 60 minutes total. When the addition of the second monomer blend was complete, the remaining initiating solution was promptly added in less than one minute. Stirring of the contents of the flask at 85° C. plus or minus 3° C. was maintained for 30 minutes after the completion of the addition of the initiating solution. Thereafter the contents of the reaction flask were cooled to ambient temperature and filtered through a fine paint strainer, (Paul N. Gardner Company, Inc. Pompano Beach, Fla., Item number ST-F 60×48 mesh) to provide the acrylic latex, PR-6.

This acrylic latex had a particle size of 81 nm, 33.7% solids, and Tg −21° C.

PR-8

A 3-liter, round bottom flask was equipped with a condenser, addition funnel, initiating solution inlet port, mechanical stirrer, heater and temperature controller probe, with the contents maintained under a nitrogen atmosphere. The flask was charged with 700 grams of deionized water and 6.90 grams of POLYSTEP B-7. A first initiating solution of 0.40 grams ammonium persulfate in dissolved in 100 mL of deionized water was prepared. A first monomer blend of 140.0 grams methyl methacrylate, 4.0 grams glycidyl methacrylate, and 50.0 grams n-butyl acrylate was prepared and placed in the addition funnel. A second monomer blend of 140.0 grams methyl methacrylate, 4.0 grams glycidyl methacrylate, 50.0 grams n-butyl acrylate, and 12.0 grams of methacrylic acid was prepared. While stirring, the contents of the reaction flask was heated to 85° C. and maintained at that temperature, within a range of 3° C., through the following steps.

The synthesis of the acrylic latex was initiated by the first addition to the flask of 80 mL of the first initiating solution, followed within one minute by the second addition of 20 mL of the first monomer blend from the addition funnel. These two additions were complete in less than one minute. The remaining portion of first monomer blend in the addition funnel was added to the flask, beginning within two minutes, at a constant rate over a period of 60 minutes. At the end of the addition of the first monomer blend, the second monomer blend was promptly added within two minutes to the addition funnel and immediately thereafter was added to the flask at a constant rate over a period of 60 minutes total. When the addition of the second monomer blend was complete, the remaining initiating solution was promptly added in less than one minute. Stirring of the contents of the flask at 85° C. plus or minus 3° C. was maintained for 30 minutes after the completion of the addition of the initiating solution. Thereafter the contents of the reaction flask were cooled to ambient temperature and filtered through a fine paint strainer, (Paul N. Gardner Company, Inc. Pompano Beach, Fla., Item number ST-F 60×48 mesh) to provide the acrylic latex, PR-8.

This acrylic latex had particle size 92 nm, 33.5% solids, and Tg 72° C.

PR-9

A 3-liter, round bottom flask was equipped with a condenser, addition funnel, initiating solution inlet port, mechanical stirrer, heater and temperature controller probe, with the contents maintained under a nitrogen atmosphere. The flask was charged with 700 grams of deionized water and 6.90 grams of POLYSTEP B-7. A first initiating solution of 0.40 grams ammonium persulfate in dissolved in 100 mL of deionized water was prepared. A first monomer blend of 110.0 grams methyl methacrylate, 4.0 grams glycidyl methacrylate, and 80.0 grams n-butyl acrylate was prepared and placed in the addition funnel. A second monomer blend of 110.0 grams methyl methacrylate, 4.0 grams glycidyl methacrylate, 80.0 grams n-butyl acrylate, and 12.0 grams of methacrylic acid was prepared. While stirring, the contents of the reaction flask was heated to 85° C. and maintained at that temperature, within a range of 3° C., through the following steps.

The synthesis of the acrylic latex was initiated by the first addition to the flask of 80 mL of the first initiating solution, followed within one minute by the second addition of 20 mL of the first monomer blend from the addition funnel. These two additions were complete in less than one minute. The remaining portion of first monomer blend in the addition funnel was added to the flask, beginning within two minutes, at a constant rate over a period of 60 minutes. At the end of the addition of the first monomer blend, the second monomer blend was promptly added within two minutes to the addition funnel and immediately thereafter was added to the flask at a constant rate over a period of 60 minutes total. When the addition of the second monomer blend was complete, the remaining initiating solution was promptly added in less than one minute. Stirring of the contents of the flask at 85° C. plus or minus 3° C. was maintained for 30 minutes after the completion of the addition of the initiating solution. Thereafter the contents of the reaction flask were cooled to ambient temperature and filtered through a fine paint strainer, (Paul N. Gardner Company, Inc. Pompano Beach, Fla., Item number ST-F 60×48 mesh) to provide the acrylic latex, PR-9.

This acrylic latex had particle size 94 nm, 33.4% solids, and Tg 39° C.

Donor Formulations

Coating formulations were prepared using the compositions stated in the Tables 7A-I. All amounts in Tables 7A-I are listed in grams. The coatings are classified according to the molecular weight of the polymer resin binder in Table 7.

TABLE 7

List of coating formulations. Samples designated as low molecular weight employ inventive binders. Samples listed as high molecular weight blends contain binders that are comparative examples.

| Formulation | Polymer Resin Type | $T_g$ of Binder Polymer (° C.) |
|---|---|---|
| DF-1B | High Mw Blend | — |
| DF-1LH | Low Mw | 92 |
| DF-2B | High Mw Blend | — |
| DF-2LH | Low Mw | 92 |
| DF-2LL-2 | Low Mw | 55 |
| DF-2LL | Low Mw | 55 |
| DF-3B | High Mw Blend | — |
| DF-3LL | Low Mw | 55 |
| DF-4B | High Mw Blend | — |
| DF-4LL | Low Mw | 55 |
| DF-5B | High Mw Blend | — |
| DF-5LL | Low Mw | 55 |
| DF-6B | High Mw Blend | — |
| DF-6LL | Low Mw | 55 |
| DF-7L | Low Mw | 73 |
| DF-8L | Low Mw | 70 |
| DF-9L | Low Mw | 73 |

TABLE 7A

Donor formulations

| Formulation | Zonyl ® FSA | NIR-1 | Water | PR-3 | PR-4 | PD-R3 | PD-R4 |
|---|---|---|---|---|---|---|---|
| DF-1B | 0.143 | 0.156 | 28.273 | 10.725 | — | 18.165 | 2.836 |
| DF-1LH | 0.143 | 0.156 | 28.273 | — | 10.725 | 18.165 | 2.836 |

TABLE 7B

Donor formulations

| Formulation | Zonyl® FSA | NIR-1 | Water | PR-1 | PR-3 | PR-4 | 32S195 | 32S212 |
|---|---|---|---|---|---|---|---|---|
| DF-2B | 0.180 | 0.155 | 38.183 | — | 12.139 | — | 8.880 | 0.463 |
| DF-2LH | 0.160 | 0.153 | 29.383 | — | — | 11.940 | 17.243 | 1.122 |
| DF-2LL-2 | 0.160 | 0.153 | 29.383 | 11.940 | — | — | 17.243 | 1.122 |
| DF-2LL | 0.180 | 0.155 | 38.183 | 12.139 | — | — | 8.880 | 0.463 |

TABLE 7C

Donor formulations

| Formulation | Zonyl® FSA | NIR-1 | Water | PR-1 | PR-3 | 32G200 | PD-Y3 |
|---|---|---|---|---|---|---|---|
| DF-3B | 0.180 | 0.155 | 38.020 | — | 4.486 | 11.880 | 5.280 |
| DF-3LL | 0.180 | 0.155 | 38.020 | 4.486 | — | 11.880 | 5.280 |

TABLE 7D

Donor formulations

| Formulation | Zonyl® FSA | NIR-1 | Water | PR-1 | PR-3 | 32G200 | PD-Y3 |
|---|---|---|---|---|---|---|---|
| DF-4B | 0.180 | 0.155 | 37.180 | — | 8.446 | 9.720 | 4.320 |
| DF-4LL | 0.180 | 0.155 | 37.180 | 8.446 | — | 9.720 | 4.432 |

TABLE 7E

Donor formulations

| Formulation | Zonyl® FSA | NIR-1 | Water | PR-1 | PR-3 | PD-Y3 | PD-G2 | PD-G3 |
|---|---|---|---|---|---|---|---|---|
| DF-5B | 0.180 | 0.155 | 26.500 | — | 5.566 | 6.000 | 12.000 | 9.600 |
| DF-5LL | 0.180 | 0.155 | 26.500 | 5.566 | — | 6.000 | 12.000 | 9.600 |

TABLE 7F

Donor formulations

| Formulation | Zonyl® FSA | Water | PR-1 | PR-3 | PD-K1 | Zinpol 20 |
|---|---|---|---|---|---|---|
| DF-6B | 0.100 | 1.756 | — | 1.500 | 8.480 | 0.668 |
| DF-6LL | 0.459 | 10.665 | 6.872 | — | 38.919 | 3.086 |

TABLE 7G

Donor formulation for DF-7L.

| Ingredient | Weight (grams) |
|---|---|
| Distilled water | 51.0 |
| Joncryl® 63 | 26.0 |
| 32S195 | 19.4 |
| 32S212 | 1.0 |
| Ammonium hydroxide (3%) | 0.7 |
| Zonyl® FSA | 0.4 |

TABLE 7G-continued

Donor formulation for DF-7L.

| Ingredient | Weight (grams) |
|---|---|
| NIR-1 | 0.4 |
| Aerotex® 3730 | 1.2 |

TABLE 7H

Donor formulation for DF-8L.

| Ingredient | Weight (grams) |
|---|---|
| Distilled water | 13695.0 |
| Carboset XPD-2091 | 1914.0 |
| 32S195 | 2025.0 |
| 32S212 | 105.6 |
| Ammonium hydroxide (3%) | 69.1 |

TABLE 7H-continued

Donor formulation for DF-8L.

| Ingredient | Weight (grams) |
|---|---|
| NIR-1 | 30.6 |
| Aerotex® 3730 | 120.1 |

TABLE 7I

Donor formulation for DF-9L.

| Ingredient | Weight (grams) |
|---|---|
| Distilled water | 49.9 |
| Joncryl® 63 | 18.8 |
| 32R238D | 22.6 |
| 32Y145D | 6.5 |
| Ammonium hydroxide (3%) | 0.4 |
| Zonyl® FSA | 0.4 |
| NIR-1 | 0.4 |
| Aerotex® 3730 | 1.1 |

Additional coating formulations were prepared as summarized in Table 8. The amounts of materials listed in Table 9 were added to a stirred 40 L stainless steel vessel under air in the order: water, Zonyl® FSA, NIR-1; polymer resin (either pre-neutralized or neutralized with the specified amount of 3% ammonium hydroxide immediately prior to use) and pigment dispersions. The formulations were then stirred for 24–48 hours and filtered through a 5μ filter.

Formulations DF-7L and DF-9L were coated on 2 mil (50.8 micron) thick un-metallized LJX111 polyester base using the Waterproof® CV Coater with a #5 Meyer rod. The coatings were dried at 50° C. for 5 minutes in flowing air.

The formulations listed in Table 8 were coated onto the specified film bases using a conventional slot die coating applicator and were dried at temperatures which increased

TABLE 8

Formulations for donor coatings. All weights are listed in grams.

| | CF-1R | CF-1B | CF-1G | CF-1K | CF-2R | CF-2B | CF-2G |
|---|---|---|---|---|---|---|---|
| Film Base | Melinex® 6442 | Melinex® 473 | Melinex® 473 | Melinex® 473 | Melinex® LJX111 | Melinex® 453 | Melinex® 453 |
| Optical Density(a) | 2.40 @ 473 nm 1.45 @ 551 nm | 2.03 @ 610 nm 1.99 @ 783 | 1.73 @ 655 nm | 2.99 @ 650 nm | 1.97 @ 553 nm | 2.23 @ 763 nm | 1.53 @ 423 nm |
| Coating weight (mg/dm$^2$) | 18 | 10.6 | 16.1 | 18 | 11.1 | 13.9 | 14.9 |
| PD-K1 | — | — | — | 8621.5 | — | — | — |
| PD-B1 | — | 2131.2 | — | — | — | 3853.0 | — |
| PD-V1 | — | 111.2 | — | — | — | 201.0 | — |
| PD-G1 | — | — | 1265.1 | — | — | — | 4073.2 |
| PD-R1 | 308.6 | — | — | — | — | — | — |
| PD-R2 | 4263.2 | — | — | — | — | — | — |
| PD-R3 | — | — | — | — | 2531.3 | — | — |
| PD-Y1 | — | — | — | — | 723.2 | — | 1272.8 |
| PD-Y2 | — | — | 388.8 | — | — | — | — |
| PR-1 (Neutralized) | 2647.6 | 2913.2 | 1114.5 | 1555.1 | — | — | — |
| PR-1 (Acidic) | — | — | — | — | 1344.7 | 5255.2 | 3911.0 |
| Zonyl(r) FSA | 43.2 | 43.2 | 24.0 | 79.7 | 36.0 | 78.1 | 79.2 |
| Zinpol® 20 | — | — | — | 1110.8 | — | — | — |
| NIR-1 | 37.2 | 37.2 | 20.6 | — | 31.0 | 67.1 | 68.2 |

Donor Film Bases

Donor films were coated on metallized polyester film base as summarized in Table 9. All raw polyester base film was provided by DuPont Teijin Films (Wilmington, Del.). Metal coatings were applied by CP Films Inc. (Martinsville, Va.). Examples of donor films prepared on clean polyester film bases without metal are also described below.

TABLE 9

Base films used in preparation of red, green, blue and black donor films employing metal heating layers. The listed film bases were metallized to 50% visible light transmission with metallic chromium.

| Base Film | Film Thickness (microns) | Comments |
|---|---|---|
| Melinex® 473 | 102 | — |
| Melinex® 6442 | 102 | This base incorporates a filter dye absorbing at 670 nm (OD = 0.6 +/− 0.1) with OD < 0.1 at 830 nm. |
| Melinex® LJX111 | 25 | — |
| Melinex® 453 | 51 | — |

Coating Conditions

The solutions described in Table 7A-F were coated on Melinex® 473 with 50% T Chromium. The coatings were prepared using an automated rod coater (Waterproof® CV Coater, DuPont, Wilmington, Del.) employing a #6 Meyer rod. The coatings were dried at 50° C. for 5 minutes in flowing air.

from an initial value of 38° C. to a final value of 65° C. over a period of approximately 5 minutes.

Formulation DF-8L was coated onto both un-metallized Melinex® 573 (DF-8L-NM) and onto Melinex® 6442 which was metallized to 50% optical transmission with chromium metal (DF-8L-Cr). Coatings were prepared using a conventional slot die coating applicator as described above. The coating weights for DF-8L-NM and DF-8L-Cr were 13.0 and 18.1 mg/dm$^2$, respectively.

Flexible Receiver Films

FR-1

A receiver film (FR-1) was prepared as follows. A coating composition was prepared in a 40-Liter stainless steel vessel with the following ingredients: 3241.69 grams of deionized water, 144.08 grams of Zonyl FSA, 2161.13 grams of Butyl Cellosolve, 9148.78 grams of PR-8, and 21323.13 grams of PR-9, added to the vessel in the stated order. The composition was coated to a dry coating weight of 13.1 mg/dm$^2$ on a supporting base. The coating composition was coated on the Elvax® 550 surface of a supporting base of 64 micron thick Elvax® 550 (ethylene vinyl acetate copolymer, DuPont) coated onto 102 micron thick Cronar® 471X polyester (DuPont, Wilmington, Del.). The coated supporting base was dried at temperatures which increased from an initial value of about 38° C. to a final value of about 65° C. over a period of, about 5 minutes. After the film was dried, it was interleaved with OSM matte polyethylene film (Tredegar Co., New Bern, N.C.) and run at ambient temperature through nip rolls at 650 kPa to emboss the polyethylene pattern onto the receiver surface. The polyethylene film was left on the receiver surface until just prior to imaging to prevent contamination of the coated surface during subsequent handling.

FR-2

A receiver film was prepared as follows. A coating composition was prepared in a 40-Liter stainless steel vessel with the following ingredients: 10455.60 grams of deionized water, 36.00 grams of Zonyl FSA, 900.00 grams of Butyl Cellosolve, 2607.60 grams of PR-8, 3910.80 grams of PR-9 and 90.00 grams of 10% DMEA (w/w) in water, added to the vessel in the stated order. The composition was coated to a dry coating weight of 12.9 mg/dm$^2$ on a supporting base using a conventional slot die coating applicator as described above. The film base for the coating comprised a 102 micron Cronar®471X polyester base (DuPont, Wilmington, Del.) upon which was coated a 32 micron layer composed of 98.75% white Elvax® 550 chip (whose composition was 95% Elvax® 550/5% rutile titanium dioxide) and 1.25% blue Elvax® chip (whose composition was 98% Elvax® 550/2% Phthalocyanine Pigment Blue 15:3). The coated supporting base was dried at temperatures which increased from an initial value of about 38° C. to a final value of about 65° C. over a period of about 5 minutes. After the film was dried, it was interleaved with OSM matte polyethylene film (Tredegar Co., New Bern, N.C.) and run at ambient temperature through nip rolls at 310 kPa to emboss the polyethylene pattern onto the receiver surface. The polyethylene film was left on the receiver surface until just prior to imaging to prevent contamination of the coated surface during subsequent handling.

Permanent Substrate

Images prepared via direct to glass imaging were prepared on Corning 1737 display grade glass (0.7 mm thick). Prior to thermal imaging of the colors, a pattern of opaque Chromium grid lines was prepared on the glass using conventional photolithographic processes. The Chromium mask pattern is also frequently referred to as a black mask. The black mask grid pitch was approximately 90μ×300μ, typical of a conventional XGA display for laptop computing applications. The glass used in imaging was ca. 30 cm×36 cm in size with the black mask pattern covering an area of ca. 20 cm×25 cm.

Prior to preparation of the glass for imaging, the glass was carefully cleaned. Surface debris was first removed by blowing high pressure ionized nitrogen gas (SIMCO Top Gun Ionizing Air Gun, Model 4005105). The glass was then washed with soap (Micro® brand cleaner), rinsed with water, isopropanol and finally with deionized water. The glass was dried under nitrogen purge. Immediately prior to application of the receiver film (see below) the glass was again cleaned with high-pressure nitrogen.

A receiver film for the permanent substrate was prepared as follows. A coating solution was prepared with the composition shown in Table 10. The coating solution was prepared in water as solvent at 15% solids. The solution was coated to a dry coating weight of 30 mg/dm$^2$ on a supporting base using a conventional slot die coating applicator as described above. The supporting base was made up of 64 micron thick Elvax® 550 (DuPont) coated onto 102 micron thick Cronar® 471X (DuPont). The coating was dried at temperatures that increased from an initial value of 38° C. to a final value of 65° C. The smooth surface of the dried film was covered with a smooth polyethylene coversheet to prevent contamination of the coated surface during subsequent handling.

TABLE 10

Receiver film composition RF-1.

| Material | Weight (grams) |
| --- | --- |
| PR-2 | 12574.0 |
| Zonyl ® FSA | 43.2 |
| N,N-Dimethylethanolamine | 109.6 |
| Butyl cellosolve | 1106.0 |
| Distilled Water | 22186.0 |

The glass permanent substrate was prepared for imaging by lamination of the receiver film. The lamination was carried out Riston® Model HRL-24 Roll Laminator (DuPont). After removing the cover sheet, the receiver film (RF-1) was placed with the coating side in contact with the cleaned surface of the glass (the surface with the preformed opaque Chromium mask). Lamination was carried out with the rollers heated to 97° C. at a speed of 0.2 meters/minute. The laminator air feed was adjusted to a pressure of 276 kPa. Following lamination, the assembly was allowed to cool completely before removal of the coating support. In practice the removal of the coating support was generally carried out immediately prior to imaging in order to protect the receiver coating surface from contamination in handling. After removal of the coating support, the surface of the receiver coating on glass is very smooth. Measurement of the surface roughness of the laminated receiver coating with a Wyko Model RST Plus Surface Profiler (Wyko Corp., Tucson, Ariz.) gave an average roughness ($R_a$) of 28 nm over a measurement area of 1.08 mm$^2$.

Imaging Equipment

Color filter images were prepared utilizing two different versions of imaging equipment, a drum imager and a flat bed imager.

Drum Imager

The first was a conventional drum type imager comprising a Creo Model 3244 Spectrum Trendsetter (Creo Inc., Vancouver, Canada) equipped with a 20 W laser head (90) operating at a wavelength of 830 nm. Imaging films were exposed to radiation (L) from the back side through the donor film base as shown schematically in FIG. 5A. Films were mounted using vacuum hold down to a standard plastic carrier plate (36) clamped mechanically to the drum (37). Control of the laser output was under computer control to build up the desired image pattern. The desired three color image was built up by sequentially exposing the red, green and blue donor films. The exposure order for the colors can be varied according to other system requirements (e.g. optimal exposure characteristics).

Flatbed Imager

The second type of imager (the "flatbed") employed an identical imaging head to that on the Spectrum Trendsetter 3244, but the imager was based on a flatbed format rather than the Trendsetter drum format.

This apparatus, which is particularly useful for imaging with rigid media, is shown schematically in FIG. 5B. The sample to be exposed was mounted using vacuum hold down to a translation stage (37') positioned below the laser head (90). During exposure, the sample was translated past the imaging head at a speed of 1.0–1.2 m/s. Following the completion of each exposure pass to radiation (L), the imaging head was translated in the direction orthogonal to the sample translation to move a new unexposed area of film in front of the laser for the next imaging pass. This process was repeated to build up the completed exposure. As for the drum imager, the desired colored image is prepared by sequentially exposing the various colored donor films to the receiver surface of the same permanent substrate.

A modified version of the flatbed imager was also used in preparation of some color filter images. This imager differed from that described above only in that the laser imaging head employed a 50 watt laser head. All image patterns prepared using this imager were composed of parallel colored lines with a width of 87 microns on a pitch of 279 microns. This pattern is representative of features associated with a single color (R, G or B) in typical color filters employed in displays for personal computers. In this case, the full RGB color filter pattern employed in the display would consist of alternating RGB lines 87 microns in width on a pitch of 279/3=93 microns.

For both the drum based and flatbed imaging systems, laser power was controllable and was adjusted in an iterative fashion to optimize image quality as judged by detailed inspection of the transferred image on the receiving surface.

Exposure Conditions

The donor films prepared using the coatings listed in Table 7A–F were imaged using the Trendsetter 3244 Imager. All images were prepared using receiver film FR-1. Images consisted of two types of patterns. The first pattern was composed of an array of parallel lines 105µ in width with a pitch of 330µ. This pattern is representative of the color features used in the preparation of color filters for use in LCD displays. The second pattern was a grid pattern of 35µ lines with a pitch of 300µ×110µ. This pattern is representative of the patterns used in preparation of black mask patterns for color filters for use in LCD displays. The imaging properties of the films are summarized in Table 11. Image quality was evaluated based upon microscopic examination of the images formed on the receiver sheet. Key aspects of image quality include (1) clean sharp edges with no serration, debris, partially adhered fragments of color coating (2) well formed image lines with no pinholes or voids, (3) complete transfer of the donor coating so that no residue remains on the donor sheet after exposure (4) absence of discoloration or surface contamination of the images (5) no degradation or decomposition of the transferred coating (6) good geometric accuracy of the transferred image (7) good adhesion of the transferred image to the receiver film. The imaged samples were examined using these criteria and assigned image quality scores were assigned ranging from 1 (poor) to 5 (excellent). The data in Table 11 show that in all cases the low molecular weight binders delivered as good or better imaging performance than the comparative high molecular weight binders.

TABLE 11

Imaging properties of comparative (Type C) and inventive (Type I) donor films. Exposure conditions were selected so as to compare the best exposure conditions of each set of films.

| Donor Film | Type | Drum Speed (rpm) | Laser Power (watts) | Nominal Exposure Energy (mJ/cm2) | Image Quality Score |
|---|---|---|---|---|---|
| DF-1B | C | 150 | 9.00 | 422 | 3 |
| DF-1LH | I | 150 | 8.40 | 394 | 4 |
| DF-2B | C | 150 | 7.00 | 328 | 3 |
| DF-2LH | I | 150 | 7.25 | 340 | 3 |
| DF-2LL-2 | I | 150 | 6.85 | 321 | 4 |
| DF-2LL | I | 150 | 7.75 | 363 | 4 |

TABLE 11-continued

Imaging properties of comparative (Type C) and inventive (Type I) donor films. Exposure conditions were selected so as to compare the best exposure conditions of each set of films.

| Donor Film | Type | Drum Speed (rpm) | Laser Power (watts) | Nominal Exposure Energy (mJ/cm2) | Image Quality Score |
|---|---|---|---|---|---|
| DF-3B | C | 150 | 7.50 | 351 | 2 |
| DF-3LL | I | 150 | 6.80 | 319 | 3 |
| DF-4B | C | 150 | 7.30 | 342 | 3 |
| DF-4LL | I | 150 | 7.30 | 342 | 4 |
| DF-5B | C | 150 | 7.00 | 328 | 1 |
| DF-5LL | I | 150 | 6.00 | 281 | 3 |
| DF-6B | C | 80 | 4.75 | 417 | 3 |
| DF-6LL | I | 80 | 3.55 | 312 | 3 |

Preparation of Four-Color Color Filter on Flexible Substrate

A color filter on flexible substrate was prepared by imaging the materials shown in Table 12 on the Trendsetter 3244. The color filter pattern consisted of parallel stripes of red, green and blue lines that were 105µ in width. The colored lines were separated by gaps of 5µ. The colored lines were overprinted with a grid of black lines with widths of 35µ. The black grid lines were aligned so as to be centered on top of the gap between the color stripes. In the direction orthogonal to the color lines, the black grid had a pitch of 300µ.

TABLE 12

Exposure parameters for color filter sample prepared on flexible substrate. The receiver film was FR-2. The sample was exposed in the order blue, red, green, black.

| Parameter | CF-1R | CF-1B | CF-1G | CF-1K |
|---|---|---|---|---|
| Color | Red | Blue | Green | Black |
| Laser power (watts) | 4.50 | 4.00 | 3.75 | 4.00 |
| Drum speed (rpm) | 66.0 | 66.0 | 66.0 | 66.0 |
| Nominal Exposure Energy (mJ/cm$^2$) | 495 | 440 | 410 | 440 |

Lamination of Four-Color Color Filter to Glass Glass Preparation:

Corning 1737 display grade glass (18 cm square) was rinsed with deionized water, rinsed and gently scrubbed with soapy water (Micro® brand cleaner), rinsed with deionized water, rinsed with isopropanol, rinsed with deionized water, and then dried vertically in a stream of dry nitrogen at room temperature.

Lamination of Color Filter to Glass:

AR-1 was diluted to 5% solids with water containing 6% butyl cellosolve. This coating mixture was coated onto the prepared glass samples with a spin coater at 1000 rpm. The coated glass was dried at room temperature for 24 hours.

The color filter prepared on flexible receiver was laminated to the adhesive-coated glass in a Tetrahedron Model MTP13 laminator at 80° C. for three minutes and 7 MPa pressure. The laminated color filter was allowed to cool to room temperature and then the backing film was peeled off to leave the completed color filter image permanently bonded to the surface of the glass substrate.

Lamination of Planarizing Film to Color Filter on Glass:

A coating composition was prepared by mixing, in order, 4.50 grams of PR-1, 4.76 grams of water, 0.70 grams of butyl cellosolve, and 0.040 grams of Zonyl® FSA. The coating composition was then coated on Melinex® 573 base to a thickness of 60 mg/dm² employing the Waterproof® CV coater. The coating was dried at 50° C. for 5 minutes in flowing air. This planarizing film was then placed coated side down on the color filter on glass and then laminated in the Tetrahedron press laminator at 130° C. for three minutes at 14 MPa pressure. The planarized color filter was then cooled to room temperature before the Melinex® base was peeled off. The planarized color filter was then annealed in an oven at 200° C. for 60 minutes to yield a crosslinked, overcoated color filter on glass.

Preparation of Three-Color Color Filter Directly on Glass with Preformed Black Mask Exposure Conditions:

Color filter samples on glass were prepared using flatbed imager and the exposure parameters indicated in Table 13. One color filter (CF-1) was prepared using donors CF-1R, CF-1B and CF-1G and two color filters (CF-2A and CF-2B) were prepared using donors CF-2R, CF-2B and CF-2G. During exposure of the donor films, the ambient environment was maintained at a preferred exposure condition of 40±5% RH and 22±2° C.

TABLE 13

Exposure parameters used in production of color filter samples.

| | CF-1 | | | CF-2A and CF-2B | | |
|---|---|---|---|---|---|---|
| Exposure Setting | CF-1R | CF-1B | CF-1G | CF-2R | CF-2B | CF-2G |
| Laser Power (watts) | 6.25 | 5.50 | 5.75 | 4.75 | 4.50 | 4.75 |
| Surface Depth (microns) | 120 | 85 | 75 | 40 | 72 | 52 |
| Swath Width (microns) | — | — | — | 953 | 956 | 959 |
| Writing Velocity (meter/sec) | 1.2 | 1.2 | 1.2 | 1.2 | 1.2 | 1.2 |
| Exposure order | 3 | 1 | 2 | 2 | 3 | 1 |

Figure 6:
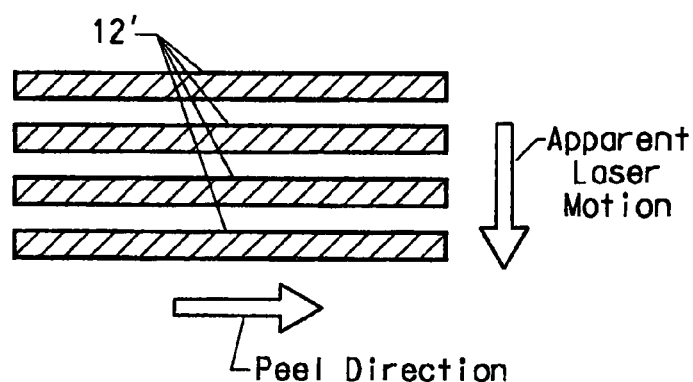
FIG. 6 shows the orientation of color stripes to the peel direction.

Imaging Procedures:

Following the exposure of each donor film, the spent donor was separated from the glass surface in the following manner. This procedure has been shown to significantly increase image quality of the color filter line patterns. During the peeling process, a metal rod with diameter of 1.5" was held in firm contact with the donor film. The rod was then used to maintain a constant radius of curvature of the donor film during the peeling process. The peeling process was carried out a uniform speed of about 1.25 meters/minute. The direction of the peeling process was arranged parallel to the lines of the color filter pattern as shown in FIG. 6. In FIG. 6, the black mask pattern has been omitted for clarity. The direction of apparent laser motion during the writing process is also indicated in the FIG. 6.

Planarizing Film

A planarizing film was prepared using the composition listed in Table 14. This solution was coated with a #12 Meyer rod to give a dried coating on Melinex® 573 base. The film was dried for 12 minutes at 50° C. to give a dried coating (82 mg/dm²). Preparation of the planarizing film with the low molecular weight polymer resin (PR-1) leads to improved surface smoothness of the final overcoated color filter assembly.

TABLE 14

Formulation of planarizing film (OC-1).

| Material | Weight (grams) |
|---|---|
| PR-1 (neutralized) | 86.62 |
| Zonyl ® FSA | 0.14 |
| Butyl cellosolve | 7.34 |
| Deionized water | 5.89 |

A thinner version of the planarizing film was prepared using the formulation shown in Table 15, coated with a #8 Meyer rod and dried at 45° C. for 18 minutes to give a dried coating (3.0 mg/dm²).

TABLE 15

Formulation for thin planarizing film (OC-2).

| Material | Weight (grams) |
|---|---|
| PR-2 (Acidic) | 111.75 |
| Zonyl ® FSA | 0.50 |
| Butyl cellosolve | 12.50 |
| Ammonium hydroxide (3% by weight) | 2.79 |
| Deionized water | 72.46 |

Planarizing Process for Color Filter on Glass

Following the transfer of the color filter pattern to the surface of the glass, it is optional to add a colorless transparent planarizing layer (40) to the surface of the color filter as shown schematically in FIG. 7. Various means may be employed to apply this planarizing layer. In one embodiment the planarizing layer may be laminated from a carrier sheet as described in more detail below. Alternatively the planarizing layer may be applied as a liquid by conventional spin coating technologies followed by thermal drying and annealing to yield the final durable overcoat.

Laminated Planarizing Layer:

The planarizing film described above can be laminated to the finished color filter using either a roll-through lamination process employing a laminator with heated rollers or a press laminator with heated platens. In a typical press lamination a lamination stack was prepared as shown in FIG. 8. The lamination stack was placed in the vacuum laminator (Tetrahedron Model MTP13) and the sample chamber was evacuated to less than 5 torr. After evacuation, a series of up to nine bump cycles at 21 kPa was carried out to remove any trapped air between the planarizing film and the color filter on glass. Lamination was then carried out at a temperature of 110° C. and a pressure of 423 kPa. Hold times varied from 3 to 60 minutes.

Application of the planarizing layer by roll through lamination was carried out using the Riston® Model HRL-24 laminator (DuPont, Wilmington, Del.) at 110° C. with the feed air adjusted to 550 kPa and at a translation speed of 0.1 meter/minute.

Samples were also prepared using an planarizing layer applied by spin coating utilizing conventional techniques. Following application of the planarizing solution, the samples were heated to completely remove the spin coating solvent.

The overcoating methods for applying an overcoat or planarizing layer used for preparation of LCD display samples are summarized in Table 16.

TABLE 16

Overcoating methods used for color filters used in preparation of LCD display samples.

| Sample | Overcoat method |
| --- | --- |
| CF-1 | Press laminated, thick overcoat OC-1 |
| CF-2A | Spin coated overcoat |
| CF-2B | Press laminated, thin overcoat OC-2 |

Final Annealing

Prior to incorporation of the color filters into functioning displays, the color filters were annealed at 200° C. for 60 minutes in air. The annealing process crosslinks the epoxy monomers to yield improved solvent resistance and mechanical properties for the annealed color filter. Samples that employed laminated overcoats or planarizing layers were annealed after the application of the layer. Samples which employed spin coated layers were annealed prior to application of the layer.

Incorporation of Color Filters into Liquid Crystal Displays

Color filter samples CF-1, CF-2A and CF-2B were all successfully incorporated into functional active matrix liquid crystal displays using techniques which are well known within the liquid crystal display industry (see, for instance "Fundamentals of Active-Matrix Liquid-Crystal Displays", Sang Soo Kim, Society for Information Display Short Course, 2001).

Preparation of Color Filter Patterns on Permanent Receiver Substrates Without Receiver Coating The donor film prepared from formulation DF-7L was exposed on the flatbed imager with 50 W laser head using a pattern of parallel 87 microns lines on a pitch of 279 microns. The receiver was untreated 0.7 mm thick Corning 1737 glass (cleaned as described above) with no receiver coating. Exposure and processing conditions are presented in Table 17. The exposure yielded a well-resolved pattern of blue lines transferred to the glass. Following annealing in air to crosslink the image, a durable blue image on glass was obtained.

The donor film prepared from formulation DF-9L was exposed in the same manner as that for DF-7L using the conditions presented in Table 17. A well-resolved image was transferred to glass and was annealed as described above. The result was a pattern of durable red lines on glass.

The donor films prepared from formulation DF-8L (DF-8L-NM and DF-8L-Cr) were imaged as described above for DF-7L employing the conditions presented in Table 17. Both films yielded well-resolved images transferred to glass and were annealed as described above. The result was patterns of durable blue lines on glass.

TABLE 17

| Donor Film | Laser Power (watts) | Imaging speed (m/s) | Annealing conditions |
| --- | --- | --- | --- |
| DF-7L | 21.5 | 1.0 | 230° C., 30 min. |
| DF-9L | 23.0 | 1.0 | 230° C., 30 min. |
| DF-8L-NM | 23.0 | 1.0 | 200° C., 60 min. |
| DF-8L-Cr | 18.5 | 1.0 | 200° C., 60 min. |

What is claimed is:

1. A method for making a color image comprising:
 (1) imagewise exposing to laser radiation a laserable assemblage comprising;
 (A) a donor element comprising a thermally imageable layer, wherein the thermally imageable layer comprises a colorant and a crosslinkable binder having a number average molecular weight of about 10,000 to about 70,000; and
 (B) a receiver element comprising:
  (a) a receiver support; and
  (b) an image receiving layer provided on the surface of the receiver support, wherein the image receiving layer comprises a crosslinkable binder having a number average molecular weight of about 1,500 to about 70,000,
 whereby the exposed areas of the thermally imageable layer are transferred to the receiver element to form a colorant-containing image on the image receiving layer; and
 (2) separating the donor element (A) from the receiver element (B), thereby revealing the colorant-containing image on the image receiving layer of the receiver element.

2. The method of claim 1 further comprising:
 (3) applying the colorant-containing image on the image receiving layer of the receiver element to a permanent substrate, and removing the receiver support to transfer the colorant-containing image on the image receiving layer to the permanent substrate.

3. The method of claim 2 wherein the applying is by lamination.

4. The method of claim 3 wherein the receiver support is a flexible substrate.

5. The method of claim 2 wherein the permanent substrate comprises a glass substrate.

6. The method of claim 5 wherein the glass substrate is treated with adhesives or siloxane coupling agents.

7. The method of claim 2 wherein the permanent substrate comprises a rigid plastic substrate.

8. The method of claim 7 wherein the rigid plastic substrate comprises polycarbonate.

9. The method of claim 2 further comprising:
 (4) applying a planarizing layer to the image on the permanent substrate.

10. The method of claim 9 wherein the applying is by lamination.

11. The method of claim 9 wherein the planarizing layer comprises a crosslinkable binder having a weight average molecular weight of about 20,000 to about 110,000.

12. A method for making a color image comprising:
 (1) imagewise exposing to laser radiation a laserable assemblage comprising:
 (A) a donor element having a thermally imageable layer comprising a colorant and a crosslinkable binder having a number average molecular weight of about 10,000 to about 70,000; and
 (C) a permanent substrate comprising a glass substrate treated with adhesives or siloxane coupling agents, whereby the exposed areas of the thermally imageable layer are transferred to the permanent substrate to form a colorant-containing image on the permanent substrate; and
 (2) separating the donor element (A) from the permanent substrate (C), thereby revealing the colorant-containing image on the permanent substrate; and
 (3) applying a planarizing layer to the colorant-containing image on the permanent substrate.

13. The method of claim 12 wherein the glass substrate supports a pre-formed black mask pattern.

14. The method of claim 12 wherein the glass substrate that supports a pre-formed black mask pattern is treated with adhesives or siloxane coupling agents.

15. The method of claim 14 further comprising applying an image-receiving layer.

16. The method of claim 12 further comprising applying an image receiving layer.

17. The method of claim 12 wherein the applying is by lamination.

18. The method of claim 12 wherein the planarizing layer comprises a crosslinkable binder having a weight average molecular weight of about 20,000 to about 110,000.

19. A liquid crystal display comprising a color filter, wherein the color filter comprises a color image prepared by the process of claim 12.

20. The liquid crystal display of claim 19 wherein the color filter comprises a glass substrate.

21. The liquid crystal display of claim 20 wherein the glass substrate has a performed black mask pattern thereon.

22. The liquid crystal display of claim 21 wherein the color filter has at least three color images thereon.

23. The liquid crystal display of claim 22 wherein the color images are red, blue and green.

24. The process of claim 1, wherein the donor element further comprises a base element comprising a support and a heating layer.

25. The process of claim 24, wherein the donor element further comprises an ejection or subbing layer between the support and the heating layer.

26. The process of claim 1, wherein the crosslinkable binder in the thermally imageable layer is a polymer prepared by emulsion polymerization or solution polymerization.

27. The process of claim 26 wherein the crosslinkable binder in the thermally imageable layer is prepared from monomers selected from the group consisting of acrylic acid and esters, methacrylic acid and esters, and styrene.

28. The process of claim 1 wherein the colorant is a pigment.

29. The process of claim 28, wherein the pigment is selected from the group consisting of metal-containing phthalocyanines and halogenated derivatives, anthraqulnones, pyrazolones, acetoacetyl monoazos, bisazos, and methines.

30. A liquid crystal display comprising a color filter, wherein the color filter comprises a color a image made by the method of claim 1.

* * * * *

UNITED STATES PATENT AND TRADEMARK OFFICE
CERTIFICATE OF CORRECTION

| | | |
|---|---|---|
| PATENT NO. | : 7,153,617 B2 | Page 1 of 1 |
| APPLICATION NO. | : 10/511856 | |
| DATED | : December 26, 2006 | |
| INVENTOR(S) | : Jonathan V. Caspar, Gerald D. Andrews and Gregory C. Weed | |

It is certified that error appears in the above-identified patent and that said Letters Patent is hereby corrected as shown below:

Column 37, line 19: "performed" should read --pre-formed--
Column 38, line 22: "a color a image" should read --a color image--

Signed and Sealed this

Twenty-seventh Day of March, 2007

JON W. DUDAS
*Director of the United States Patent and Trademark Office*